(12) United States Patent
Li et al.

(10) Patent No.: US 10,484,935 B2
(45) Date of Patent: Nov. 19, 2019

(54) DISCOVERY FOR SPECTRUM RENTING

(71) Applicant: QUALCOMM Incorporated, San Diego, CA (US)

(72) Inventors: Junyi Li, Chester, NJ (US); Aleksandar Damnjanovic, Del Mar, CA (US); Michael Mingxi Fan, San Diego, CA (US); Yongbin Wei, La Jolla, CA (US); Tamer Kadous, San Diego, CA (US); Ahmed Sadek, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 15/950,491

(22) Filed: Apr. 11, 2018

(65) Prior Publication Data

US 2018/0359685 A1    Dec. 13, 2018

Related U.S. Application Data

(60) Provisional application No. 62/518,392, filed on Jun. 12, 2017.

(51) Int. Cl.
*H04W 4/00* (2018.01)
*H04W 48/16* (2009.01)
(Continued)

(52) U.S. Cl.
CPC ........... *H04W 48/16* (2013.01); *H04W 16/14* (2013.01); *H04W 56/001* (2013.01);
(Continued)

(58) Field of Classification Search
CPC .......... H04W 4/80; H04W 8/24; H04W 4/02; H04W 24/10; H04W 48/16; H04W 12/02; H04W 40/246; H04W 72/0453; H04W 16/14; H04W 4/023; H04W 4/06; H04W 56/001; H04W 72/1278
See application file for complete search history.

(56) References Cited

U.S. PATENT DOCUMENTS

| | | | |
|---|---|---|---|
| 2015/0126208 A1* | 5/2015 | Yu | H04W 4/023 455/452.1 |
| 2015/0189558 A1* | 7/2015 | Mika | H04W 48/16 370/329 |

(Continued)

FOREIGN PATENT DOCUMENTS

WO    WO-2016116145 A1 *  7/2016  ............ H04W 36/04

*Primary Examiner* — Khalid W Shaheed
(74) *Attorney, Agent, or Firm* — Liem T. Do

(57) ABSTRACT

Wireless communication systems and methods related to service advertising and discovery with dynamic spectrum use are provided. A user equipment (UE) receives, from a first wireless communication device, a network information signal in a spectrum. The UE receives, from a second wireless communication device, a service advertising signal based on at least a synchronization to the network information signal. The service advertising signal indicates an availability of a service. The UE transmits, to the second wireless communication device, a request for the service. The first wireless communication device and the second wireless communication device are associated with different operating entities of the spectrum.

30 Claims, 13 Drawing Sheets

(51) Int. Cl.
  *H04W 72/04*   (2009.01)
  *H04W 56/00*   (2009.01)
  *H04W 16/14*   (2009.01)
  *H04W 72/12*   (2009.01)

(52) U.S. Cl.
  CPC ... *H04W 72/0453* (2013.01); *H04W 72/1205* (2013.01); *H04W 72/1278* (2013.01)

(56) References Cited

U.S. PATENT DOCUMENTS

| | | | |
|---|---|---|---|
| 2016/0095018 A1* | 3/2016 | Vajapeyam | H04W 36/0005 370/331 |
| 2016/0295502 A1* | 10/2016 | Yoon | H04W 52/0229 |
| 2016/0315740 A1* | 10/2016 | Yi | H04W 72/005 |
| 2018/0167825 A1* | 6/2018 | Egner | H04W 16/16 |
| 2018/0184231 A1* | 6/2018 | Egner | H04W 4/06 |

\* cited by examiner

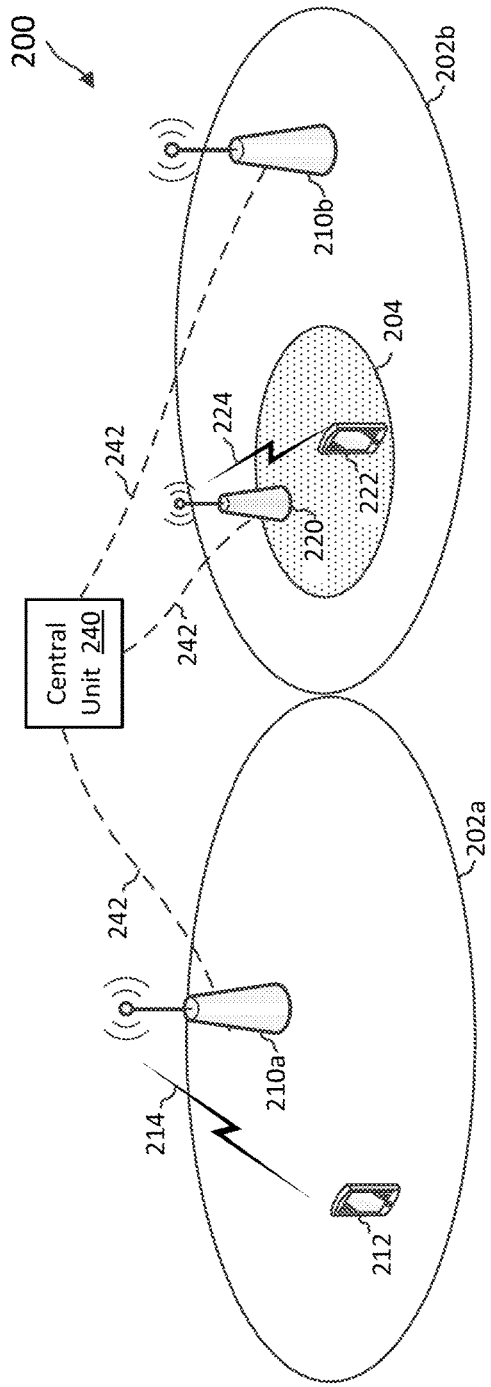
FIG. 2
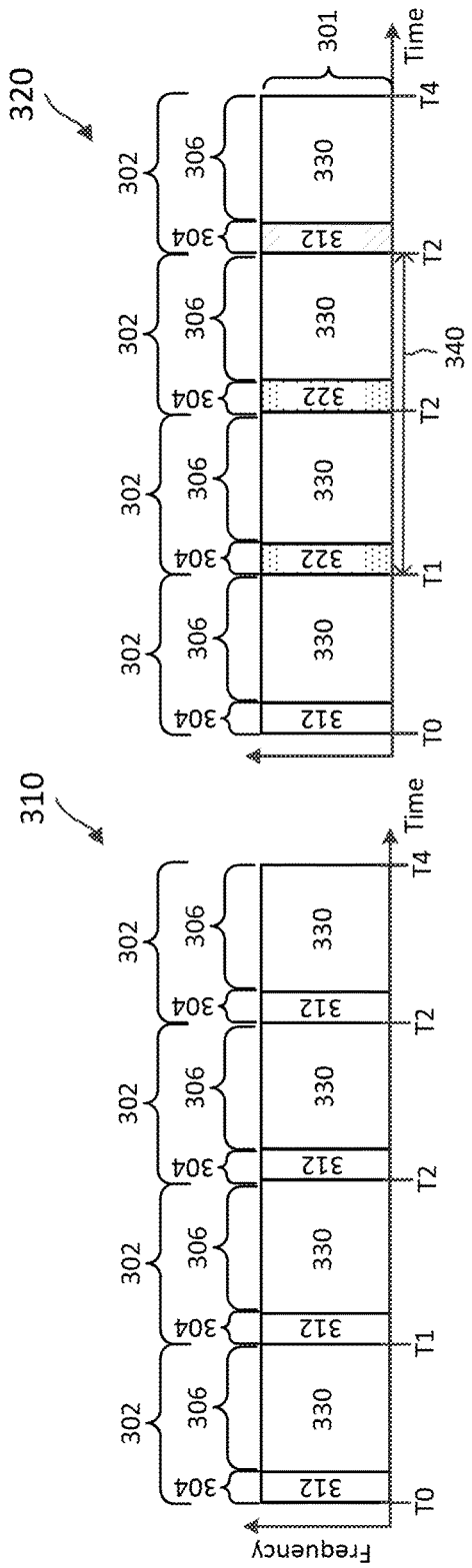
FIG. 3A
FIG. 3B

DISCOVERY FOR SPECTRUM RENTING

CROSS REFERENCE TO RELATED APPLICATIONS

The present application claims priority to and the benefit of the U.S. Provisional Patent Application No. 62/518,392, filed Jun. 12, 2017, which is hereby incorporated by reference in its entirety.

TECHNICAL FIELD

This application relates to wireless communication systems, and more particularly to service advertising and service discovery with dynamic spectrum use.

INTRODUCTION

Wireless communications systems are widely deployed to provide various types of communication content such as voice, video, packet data, messaging, broadcast, and so on. These systems may be capable of supporting communication with multiple users by sharing the available system resources (e.g., time, frequency, and power).

A wireless communications system may operate over a shared spectrum, meaning that the wireless communications system includes one or more frequency bands that may be shared by multiple network operating entities. In some instances, multiple network operating entities may share their licensed spectrum with each other or with other third-party operators to better utilize the spectrum.

One approach to sharing a medium or a spectrum is to employ a priority-based coordinated access scheme. In the priority-based coordinated access scheme, a shared spectrum is partitioned into multiple time periods. At any time period, one operator may be a primary user and have priority to access the spectrum while other operators may opportunistically access the spectrum when the spectrum is available. In some instances, the operators may take turn to become a primary user, for example, in a round-robin manner. Spectrum pooling is an example resource sharing strategy where an operator is a primary user in a spectrum owned or licensed by the operator and may opportunistically access a spectrum of another operator.

Some local operating entities or third-parties may not own any spectrum. For example, a local operating entity, such as local stores or local businesses, may provide wireless services, such as Institute of Electrical and Electronics Engineers (IEEE) 801.11 (WiFi) services, to users over an unlicensed spectrum. The unlicensed spectrum may be shared by multiple operating entities serving corresponding users. As the number of users on the unlicensed spectrum increases, the unlicensed spectrum can become congested. Thus, the local operating entity may not be able to provide guaranteed services and can only provide best-effort services over the unlicensed spectrum.

One approach to enabling local operating entities to provide high-bandwidth, high-quality services is to allow local operating entities to request temporary use (e.g., renting) of licensed spectrums in local geographic areas of the local operating entities. For example, a local operating entity may dynamically request spectrum use from one or more spectrum controlling entities (e.g., spectrum owners) based on service demands. The dynamic spectrum use allows local operating entities to provide high-bandwidth, high-quality services to user equipment (UE) in proximity of the local operating entities. In addition to spectrum sharing or renting, mechanisms for local operating entities to leverage spectrum owner network operations and/or coordinate network operations with spectrum owner network may be desirable.

BRIEF SUMMARY OF SOME EXAMPLES

The following summarizes some aspects of the present disclosure to provide a basic understanding of the discussed technology. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

For example, in an aspect of the disclosure, a method of wireless communication includes receiving, by a user equipment (UE) from a first wireless communication device, a network information signal in a spectrum; receiving, by the UE from a second wireless communication device, a service advertising signal based on at least a synchronization to the network information signal, the service advertising signal indicating an availability of a service; and transmitting, by the UE to the second wireless communication device, a request for the service, wherein the first wireless communication device and the second wireless communication device are associated with different operating entities of the spectrum.

In an additional aspect of the disclosure, a method of wireless communication includes obtaining, by a first wireless communication device, a network configuration for communication in a spectrum; transmitting, by the first wireless communication device, a service advertising signal in the spectrum based on the network configuration, the service advertising signal being based on a synchronization to a network information signal transmitted by a second wireless communication device, the service advertising signal indicating an availability of a service; and receiving, by the first wireless communication device from a user equipment (UE), a request for the service, wherein the first wireless communication device and the second wireless communication device are associated with different operating entities of the spectrum.

In an additional aspect of the disclosure, a method of wireless communication includes communicating, by a first wireless communication device with a second wireless communication device in a first frequency band, a service advertising signal indicating an availability of a service in a second frequency band; and communicating, by the first wireless communication device with the second wireless communication device in the second frequency band, a communication signal during a time period based on a spectrum use grant from a controlling entity of the second frequency band, the communication signal associated with the service, wherein the first frequency band and the second frequency band are different.

In an additional aspect of the disclosure, an apparatus includes a transceiver configured to receive, from a first wireless communication device, a network information signal in a spectrum; receive, from a second wireless communication device, a service advertising signal based on at least a synchronization to the network information signal, the service advertising signal indicating an availability of a service; and transmit, to the second wireless communication device, a request for the service, wherein the first wireless communication device and the second wireless communication device are associated with different operating entities of the spectrum.

Other aspects, features, and embodiments of the present invention will become apparent to those of ordinary skill in the art, upon reviewing the following description of specific, exemplary embodiments of the present invention in conjunction with the accompanying figures. While features of the present invention may be discussed relative to certain embodiments and figures below, all embodiments of the present invention can include one or more of the advantageous features discussed herein. In other words, while one or more embodiments may be discussed as having certain advantageous features, one or more of such features may also be used in accordance with the various embodiments of the invention discussed herein. In similar fashion, while exemplary embodiments may be discussed below as device, system, or method embodiments it should be understood that such exemplary embodiments can be implemented in various devices, systems, and methods.

BRIEF DESCRIPTION OF THE DRAWINGS

FIG. 2 illustrates a wireless communication network that implements spectrum renting according to embodiments of the present disclosure.

FIG. 3A illustrates a spectrum usage scenario according to embodiments of the present disclosure.

FIG. 3B illustrates a spectrum usage scenario with a spectrum rental according to embodiments of the present disclosure.

DETAILED DESCRIPTION

Figure 1:
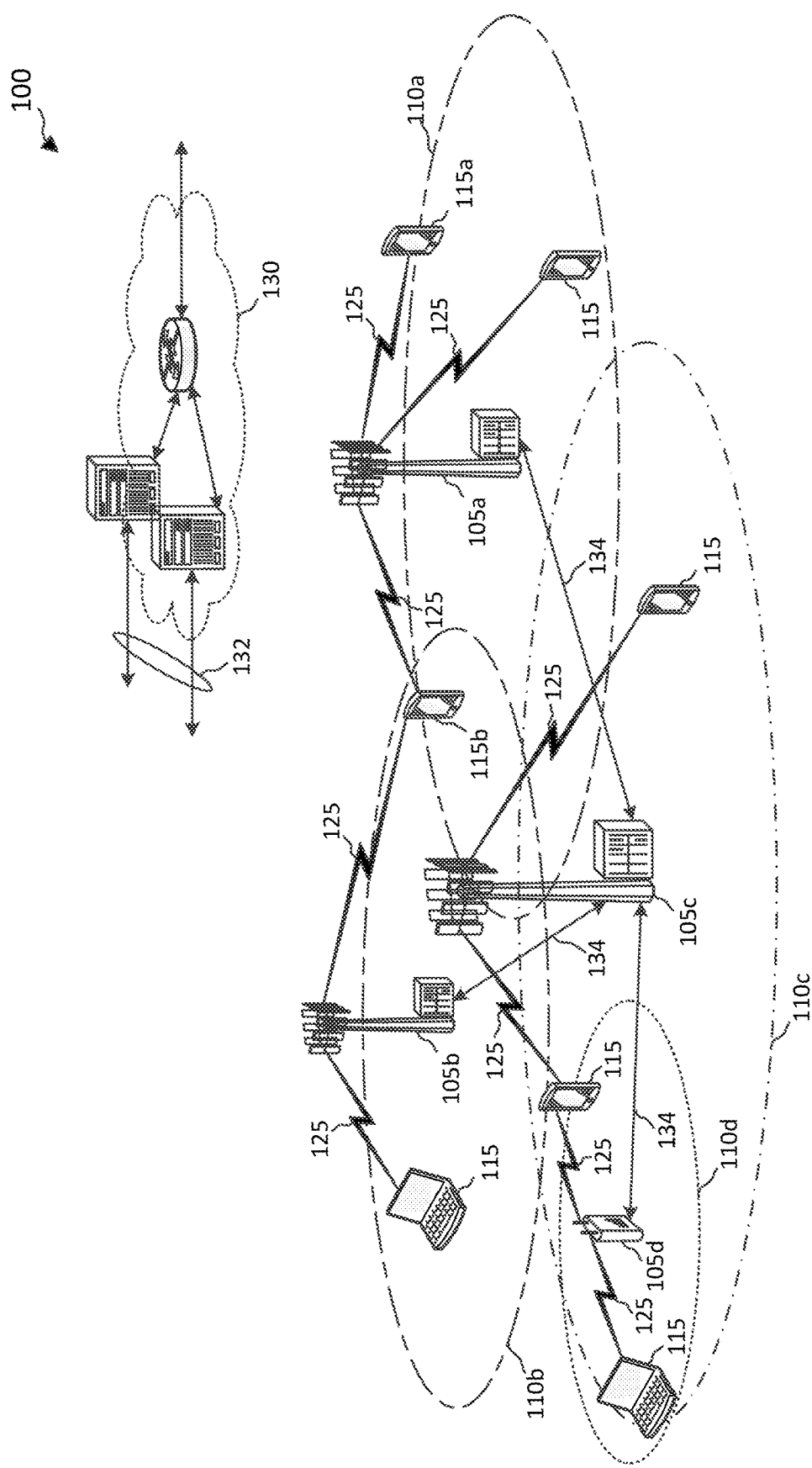
FIG. 1 illustrates a wireless communication network according to embodiments of the present disclosure.

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

The techniques described herein may be used for various wireless communication networks such as code-division multiple access (CDMA), time-division multiple access (TDMA), frequency-division multiple access (FDMA), orthogonal frequency-division multiple access (OFDMA), single-carrier FDMA (SC-FDMA) and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the wireless networks and radio technologies mentioned above as well as other wireless networks and radio technologies, such as a next generation (e.g., $5^{th}$ Generation (5G) operating in mmWave bands) network.

The present application describes mechanisms for local service advertising and discovery with dynamic spectrum use. A local operator may request temporary spectrum use (e.g., spectrum renting) of a spectrum from a controlling entity of the spectrum based on service requests from user equipments (UEs) in proximity of the local operating entity. Examples of a spectrum controlling entity may include an owner of a spectrum, an exclusive licensee of a spectrum, and a non-exclusive licensed primary operator of a spectrum. The disclosed embodiments may refer to the controlling entity as a spectrum owner.

In an embodiment, local service advertising and discovery may be performed in-band within a spectrum where a spectrum owner network operates and in synchronization with the spectrum owner network. For example, the spectrum owner network may broadcast network information signals including synchronization signals and indicating time periods designated for local service advertising. Each local operator may be assigned with dedicated time periods (e.g., including periodicities) for local service advertising. A local operator base station (BS) may transmit service advertising signals in corresponding time periods and in synchronization with the network information signals. A UE may synchronize to the network information signals and searches for local services. In an embodiment, local operators may negotiate time resources for local service advertising with a spectrum owner. In an embodiment, a spectrum owner may dynamically modify resource allocations for local service advertising and/or dynamically suspend certain local service advertising.

In an embodiment, local service advertising and discovery may be performed asynchronously in a spectrum different from where services are delivered. For example, a local operating entity may advertise service availabilities in an unlicensed band. The local operating entity may advertise services using service set identifier (SSID) in a wireless local area network (WLAN). Alternatively, a local operating entity may advertise service availabilities in a common band, for example, in a 3.5 gigahertz (GHz) shared spectrum. The local operating entity may operate in a general authorized access (GAA) tier and advertise services when the channel is idle.

Aspects of the present disclosure can provide several benefits. For example, the synchronous-in-band local service advertising and discovery allows local operator networks to leverage network information signals from spectrum owner networks instead of transmitting separate synchronization signals. The asynchronous local service advertising and discovery may allow for simpler coordination between local operators and spectrum owners.

FIG. 1 illustrates a wireless communication network 100 according to embodiments of the present disclosure. The network 100 includes BSs 105, UEs 115, and a core network 130. In some embodiments, the network 100 operates over a shared spectrum. The shared spectrum may be unlicensed or partially licensed to one or more network operators. Access to the spectrum may be limited and may be controlled by a separate coordination entity. In some embodiments, the network 100 may be a LTE or LTE-A network. In yet other embodiments, the network 100 may be a millimeter wave (mmW) network, a new radio (NR) network, a 5G network, or any other successor network to LTE. The network 100 may be operated by more than one network operator. Wireless resources may be partitioned and arbitrated among the different network operators for coordinated communication between the network operators over the network 100.

The BSs 105 may wirelessly communicate with the UEs 115 via one or more BS antennas. Each BS 105 may provide communication coverage for a respective geographic coverage area 110. In 3GPP, the term "cell" can refer to this particular geographic coverage area of a BS and/or a BS subsystem serving the coverage area, depending on the context in which the term is used. In this regard, a BS 105 may provide communication coverage for a macro cell, a pico cell, a femto cell, and/or other types of cell. A macro cell generally covers a relatively large geographic area (e.g., several kilometers in radius) and may allow unrestricted access by UEs with service subscriptions with the network provider. A pico cell may generally cover a relatively smaller geographic area and may allow unrestricted access by UEs with service subscriptions with the network provider. A femto cell may also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). A BS for a macro cell may be referred to as a macro BS. A BS for a pico cell may be referred to as a pico BS. A BS for a femto cell may be referred to as a femto BS or a home BS. In the example shown in FIG. 1, the BSs 105a, 105b and 105c are examples of macro BSs for the coverage areas 110a, 110b and 110c, respectively. The BSs 105d is an example of a pico BS or a femto BS for the coverage area 110d. As will be recognized, a BS 105 may support one or multiple (e.g., two, three, four, and the like) cells.

Communication links 125 shown in the network 100 may include uplink (UL) transmissions from a UE 115 to a BS 105, or downlink (DL) transmissions, from a BS 105 to a UE 115. The UEs 115 may be dispersed throughout the network 100, and each UE 115 may be stationary or mobile. A UE 115 may also be referred to as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A UE 115 may also be a cellular phone, a personal digital assistant (PDA), a wireless modem, a wireless communication device, a handheld device, a tablet computer, a laptop computer, a cordless phone, a personal electronic device, a handheld device, a personal computer, a wireless local loop (WLL) station, an Internet of things (IoT) device, an Internet of Everything (IoE) device, a machine type communication (MTC) device, an appliance, an automobile, or the like.

The BSs 105 may communicate with the core network 130 and with one another. The core network 130 may provide user authentication, access authorization, tracking, Internet Protocol (IP) connectivity, and other access, routing, or mobility functions. At least some of the BSs 105 (e.g., which may be an example of an evolved NodeB (eNB), a next generation NodeB (gNB), or an access node controller (ANC)) may interface with the core network 130 through backhaul links 132 (e.g., S1, S2, etc.) and may perform radio configuration and scheduling for communication with the UEs 115. In various examples, the BSs 105 may communicate, either directly or indirectly (e.g., through core network 130), with each other over backhaul links 134 (e.g., X1, X2, etc.), which may be wired or wireless communication links.

Each BS 105 may also communicate with a number of UEs 115 through a number of other BSs 105, where the BS 105 may be an example of a smart radio head. In alternative configurations, various functions of each BS 105 may be distributed across various BSs 105 (e.g., radio heads and access network controllers) or consolidated into a single BS 105.

In some implementations, the network 100 utilizes orthogonal frequency division multiplexing (OFDM) on the downlink and single-carrier frequency division multiplexing (SC-FDM) on the UL. OFDM and SC-FDM partition the system bandwidth into multiple (K) orthogonal subcarriers, which are also commonly referred to as tones, bins, or the like. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. The system bandwidth may also be partitioned into subbands.

In an embodiment, the BSs 105 can assign or schedule transmission resources (e.g., in the form of time-frequency resource blocks) for DL and UL transmissions in the network 100. DL refers to the transmission direction from a BS 105 to a UE 115, whereas UL refers to the transmission direction from a UE 115 to a BS 105. The communication can be in the form of radio frames. A radio frame may be divided into a plurality of subframes, for example, about 10. Each subframe can be divided into slots, for example, about 2. In a frequency-division duplexing (FDD) mode, simultaneous UL and DL transmissions may occur in different frequency bands. For example, each subframe includes a UL subframe in a UL frequency band and a DL subframe in a DL frequency band. In a time-division duplexing (TDD) mode, UL and DL transmissions occur at different time periods using the same frequency band. For example, a subset of the subframes (e.g., DL subframes) in a radio frame may be used for DL transmissions and another subset of the subframes (e.g., UL subframes) in the radio frame may be used for UL transmissions.

The DL subframes and the UL subframes can be further divided into several regions. For example, each DL or UL subframe may have pre-defined regions for transmissions of reference signals, control information, and data. Reference signals are predetermined signals that facilitate the communications between the BSs 105 and the UEs 115. For example, a reference signal can have a particular pilot pattern or structure, where pilot tones may span across an operational bandwidth or frequency band, each positioned at a pre-defined time and a pre-defined frequency. For example, a BS 105 may transmit cell-specific reference signals (CRSs) and/or channel state information-reference signals (CSI-RSs) to enable a UE 115 to estimate a DL channel. Similarly, a UE 115 may transmit sounding reference signals (SRSs) to enable a BS 105 to estimate a UL channel. Control information may include resource assignments and protocol controls. Data may include protocol data and/or operational data. In some embodiments, the BSs 105 and the UEs 115 may communicate using self-contained subframes. A self-contained subframe may include a portion for DL communication and a portion for UL communication. A self-contained subframe can be DL-centric or UL-centric. A DL-centric subframe may include a longer duration for DL communication than UL communication. A UL-centric subframe may include a longer duration for UL communication than UL communication.

In an embodiment, a UE 115 attempting to access the network 100 may perform an initial cell search by detecting a primary synchronization signal (PSS) from a BS 105. The PSS may enable synchronization of period timing and may indicate a physical layer identity value. The UE 115 may then receive a secondary synchronization signal (SSS). The SSS may enable radio frame synchronization, and may provide a cell identity value, which may be combined with the physical layer identity value to identify the cell. The SSS may also enable detection of a duplexing mode and a cyclic prefix length. Some systems, such as TDD systems, may transmit an SSS but not a PSS. Both the PSS and the SSS may be located in a central portion of a carrier, respectively. After receiving the PSS and SSS, the UE 115 may receive a master information block (MIB), which may be transmitted in the physical broadcast channel (PBCH). The MIB may contain system bandwidth information, a system frame number (SFN), and a Physical Hybrid-ARQ Indicator Channel (PHICH) configuration. After decoding the MIB, the UE 115 may receive one or more system information blocks (SIBs). For example, SIB1 may contain cell access parameters and scheduling information for other SIBs. Decoding SIB1 may enable the UE 115 to receive SIB2. SIB2 may contain radio resource configuration (RRC) configuration information related to random access channel (RACH) procedures, paging, physical uplink control channel (PUCCH), physical uplink shared channel (PUSCH), power control, SRS, and cell barring. After obtaining the MIB and/or the SIBs, the UE 115 can perform random access procedures to establish a connection with the BS 105. After establishing the connection, the UE 115 and the BS 105 can enter a normal operation stage, where operational data may be exchanged.

In some embodiments, the UEs 115 and the BSs 105 may be operated by multiple network operators or network operating entities and may operate in a shared radio frequency spectrum, which may include licensed or unlicensed frequency bands. The shared spectrum may be time-partitioned for sharing among the multiple network operating entities to facilitate coordinated communication. For example, in the network 100, the BS 105a and the UE 115a may be associated with one network operating entity, while the BS 105b and the UE 115b may be associated with another network operating entity. By time-partitioning the shared spectrum according to network operating entities, the communications between the BS 105a and the UE 115a and the communications between the BS 105b and the UE 115b may each occur during respective time periods and may avail themselves of an entirety of a designated shared spectrum.

To support coordinated access of the shared spectrum, a BS 105 or an entity of the core network 130 may act as a central arbitrator to manage access and coordinate the partitioning of resources among different network operating entities operating within the network 100. In some embodiments, the central arbitrator may include a spectrum access system (SAS). In addition, the transmissions from the multiple network operating entities can be time synchronized to facilitate the coordination.

In some embodiments, the network 100 may be operated over a spectrum owned by a spectrum owner. For example, the BSs 105a, 105b, and 105c are operated by a spectrum owner, while the BS 105d is operated by a local operating entity. The spectrum owner may allow the local operating entity to request a temporary use of the spectrum. For example, the BS 105d may rent the spectrum in a local geographic area of the BS 105d for a period of time to deliver a service to the UE 115d, as described in greater detail herein.

FIGS. 2, 3A, and 3B illustrate a spectrum renting scenario, where a local operator rents a spectrum from a spectrum owner for a communication session in a local geographic area of the local operator. FIG. 2 illustrates a wireless communication network 200 that implements spectrum renting according to embodiments of the present disclosure. FIG. 3A illustrates a spectrum usage scenario 310 according to embodiments of the present disclosure. FIG. 3B illustrates a spectrum usage scenario 320 with a spectrum rental according to embodiments of the present disclosure. In FIGS. 3A and 3B, the x-axes represent time in some constant units, and the y-axes represent frequency in some constant units.

The network 200 may be similar to the network 100. FIG. 2 illustrates three BSs (e.g., BSs 210 and 220) and two UEs (e.g., UEs 212 and 222) for purposes of simplicity of discussion, though it will be recognized that embodiments of the present disclosure may scale to many more UEs and/or BSs. The BSs 210 and 220 are similar to the BSs 105. The UEs 212 and 222 are similar to the UEs 115. As an example, a spectrum owner owns a spectrum 301 across geographic areas 202a and 202b. The spectrum owner operates the BSs 210 and the UE 212. The spectrum owner BS 210a and the UE 212 are in communication with each other via a link 214 (e.g., the links 125) over the spectrum 301 in the geographic area 202a. The spectrum owner BS 210b is located in a geographic area 202b. A local operator (e.g., a local business) operates the BS 220 in a geographic area 204 within the geographic area 202b. The UE 222 is located in the geographic area 204. The UE 222 may be operated by any operator, for example, the spectrum owner or another operator.

In the network 200, the spectrum owner may share the spectrum 301 with the local operator. For example, the spectrum 301 may be time-partitioned into a plurality of transmission opportunities (TXOPs) 302, where the sharing may be in units of TXOPs 302. Under normal operating conditions, the spectrum owner may access the spectrum 301 as a primary user with guaranteed access to the spectrum while the local operator may share the spectrum 301 as a secondary user with opportunistic access to the spectrum. For example, a TXOP 302 may include a channel sensing period 304 and a transmission period 306. A primary user may transmit a reservation signal in the channel sensing period 304 to reserve a following transmission period 306. A secondary user may listen to the channel (e.g., the spectrum) and opportunistically access the spectrum when the spectrum is not occupied by the primary user. As an example, the local operator BS 220 rents the spectrum 301 in the geographic area 204 for a communication session to serve the UE 222. A communication session may span a number of TXOPs 302 (e.g., in a time period 340). As shown, the local operator BS 220 and the UE 222 are in communication via a link 224 over the spectrum 301.

In an embodiment, the local operator BS 220 may be a wireless access point (AP) and the UE 222 may begin communication over an unlicensed spectrum (e.g., a WiFi spectrum). However, the unlicensed spectrum may be overcrowded, and thus the local operator BS 220 may not be able to provide the service quality requested by the UE 222. In some instances, the local operator BS 220 may also share the spectrum 301 as a secondary user to improve the service quality. To further guarantee the requested service quality, the local operator BS 220 may rent the spectrum 301 for a time period or a communication session from the spectrum owner. The renting promotes the local operator BS 220 and the UE 222 to primary users of the spectrum 301 in the geographic area 204. The renting is dynamically initiated based on a communication request, for example, from the UE 222. The renting is for a duration of time including a number of TXOPs 302. The local operator BS 220 may communicate with the UE 222 using any suitable wireless communication technology that may coexist with the spectrum owner's radio access technology. Since the spectrum owner BS 210b is close to the geographic area 204, the renting may downgrade or demote the spectrum owner to a secondary user in the geographic area 202b. Since the BS 210a and the UE 212 are in a different geographic area 202a, the BS 210a and the UE 212 may remain as the primary user.

In an embodiment, the UE 222 may be operated by the spectrum owner. However, the UE 222 may be located farther away from the spectrum owner BSs 210 than from the local operator BS 220. Thus, the UE 222 may gain a better service quality from the local operator BS 220 than from the spectrum owner BSs 210. As such, the UE 222 may request the service from the local operator BS 220 instead.

In an embodiment, the local operator BS 220 may negotiate the spectrum rental with a central unit 240 or server of the spectrum owner via backhaul links 242 (e.g., the backhaul links 132). The central unit 240 may be a server of the spectrum owner or a server of a controlling entity of the spectrum 301. The central unit 240 may include hardware and/or software components configured to instruct the local operator BS 220 and the UE 222 requesting the rental to transmit measurement signals for interference management.

The central unit 240 may instruct the spectrum owner BSs 210 and UE 212 to measure the measurement signals. The measurement signals may include spectrum reservation signals, SRSs, and CSI-RSs, and/or any suitable reference signals. The central unit 240 may determine the amount of interference from the local operator BS 220 and the UE 222 to the spectrum owner BSs 210 and UE 212 based on the measurements. The central unit 240 may determine whether to grant the rental based on the expected interference and/or other information, such as the expected network traffic load in the spectrum owner network within the geographic area 204. In some other embodiments, a spectrum owner BS 210 may act as a central unit. In such embodiments, the local operator BS 220 and/or the UE 222 may negotiate with the spectrum owner BS 210 over a wireless link.

The scenario 310 illustrates the spectrum usage in the geographic area 202a during a time T0 to a time T4. The scenario 320 illustrates the spectrum usage in the geographic area 202b during the same time period from the time T0 to the time T4. As an example, the local operator BS 220 rents the spectrum 301 for a rental time period 340 between a time T1 and a time T3. The rental time period 340 includes two TXOPs 302. In some other embodiments, the rental time period 340 can include any suitable number of TXOPs 302, such as ten, twenty-five, fifty, or a hundred. For example, each TXOP 302 may include a duration of about 10 ms to about 40 ms and the rental time period 340 may include a duration of about one second, a few seconds, or a few minutes.

In the scenario 310, the spectrum owner remains as the primary user from the time T1 to the time T4 (e.g., including the rental time period 340) in the geographic area 202a. The spectrum owner BS 210a and the spectrum owner UE 212 communicate signaling 312 of the spectrum owner during the channel sensing periods 304 and data 330 during the transmission periods 306.

In the scenario 320, the local operator is promoted to be a primary user in the rental time period 340 in the geographic area 204. The local operator BS 220 and the UE 222 communicate signaling 322 of the local operator and data 330 in the time period 340. The spectrum owner is demoted to be a secondary user in the rental time period 340 in the geographic area 202b. Thus, the local operator BS 220 has guaranteed access to the spectrum 301 during the time period 340, where the spectrum owner BS 210b may yield spectrum access to the local operator BS 220 and opportunistically share the spectrum 301 when not in use by the local operator BS 220. The spectrum owner BS 210b may revert to be a primary user after the rental time period 340 has ended (e.g., after the time T3).

In addition to requesting a temporary use or renting of a spectrum from a spectrum owner, a local operating entity may request time resources from the spectrum owner to broadcast or advertise services provided by the local operating entity so that a UE (e.g., the UEs 212 and 222) in proximity of the local operating entity may discover the services. Alternatively, a local operating entity may advertise services in a common or shared frequency band and deliver services in a frequency band rented from a spectrum owner. Mechanisms for local service advertising and discovery are described in greater detail herein.

Figure 4:
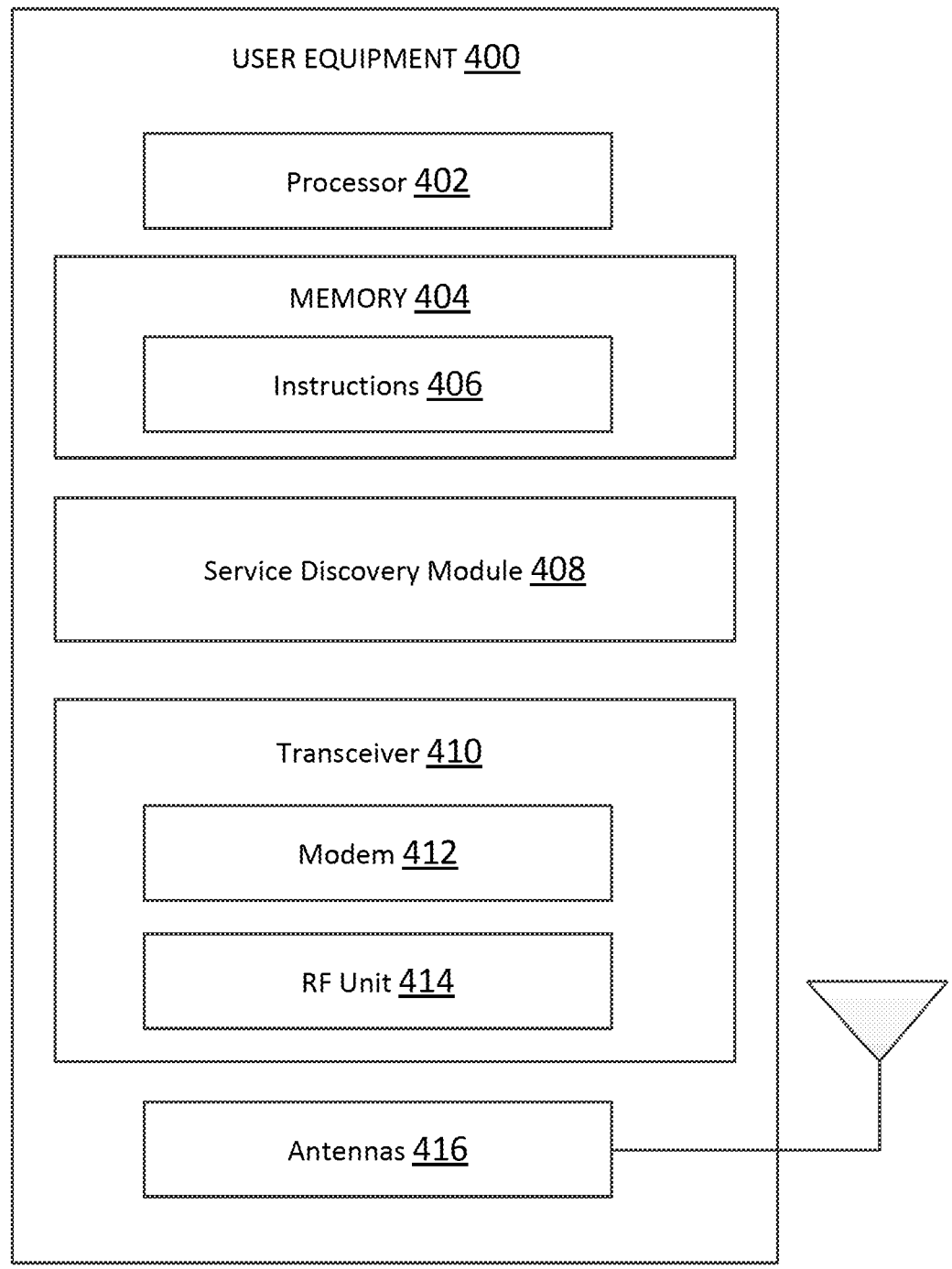
FIG. 4 is a block diagram of an exemplary user equipment (UE) according to embodiments of the present disclosure.

FIG. 4 is a block diagram of an exemplary UE 400 according to embodiments of the present disclosure. The UE 400 may be a UE 115, 212, or 222 as discussed above. As shown, the UE 400 may include a processor 402, a memory 404, a service discovery module 408, a transceiver 410 including a modem subsystem 412 and a radio frequency (RF) unit 414, and one or more antennas 416. These elements may be in direct or indirect communication with each other, for example via one or more buses.

The processor 402 may include a central processing unit (CPU), a digital signal processor (DSP), an application-specific integrated circuit (ASIC), a controller, a field programmable gate array (FPGA) device, another hardware device, a firmware device, or any combination thereof configured to perform the operations described herein. The processor 402 may also be implemented as a combination of computing devices, e.g., a combination of a DSP and a microprocessor, a plurality of microprocessors, one or more microprocessors in conjunction with a DSP core, or any other such configuration.

The memory 404 may include a cache memory (e.g., a cache memory of the processor 402), random access memory (RAM), magnetoresistive RAM (MRAM), read-only memory (ROM), programmable read-only memory (PROM), erasable programmable read only memory (EPROM), electrically erasable programmable read only memory (EEPROM), flash memory, solid state memory device, hard disk drives, other forms of volatile and non-volatile memory, or a combination of different types of memory. In an embodiment, the memory 404 includes a non-transitory computer-readable medium. The memory 404 may store instructions 406. The instructions 406 may include instructions that, when executed by the processor 402, cause the processor 402 to perform the operations described herein with reference to the UEs 115, 212, and 222 in connection with embodiments of the present disclosure. Instructions 406 may also be referred to as code. The terms "instructions" and "code" should be interpreted broadly to include any type of computer-readable statement(s). For example, the terms "instructions" and "code" may refer to one or more programs, routines, sub-routines, functions, procedures, etc. "Instructions" and "code" may include a single computer-readable statement or many computer-readable statements.

The service discovery module 408 may be used for various aspects of the present disclosure. For example, the service discovery module 408 is configured to perform network synchronization, searches for local services provided by local operating entities, requests for local services from local operating entities, and communicate with local operating entities, as described in greater detail herein.

As shown, the transceiver 410 may include the modem subsystem 412 and the RF unit 414. The transceiver 410 can be configured to communicate bi-directionally with other devices, such as the BSs 105, 210, and 220. The modem subsystem 412 may be configured to modulate and/or encode the data from the memory 404 and/or the service discovery module 408 according to a modulation and coding scheme (MCS), e.g., a low-density parity check (LDPC) coding scheme, a turbo coding scheme, a convolutional coding scheme, a digital beamforming scheme, etc. The RF unit 414 may be configured to process (e.g., perform analog to digital conversion or digital to analog conversion, etc.) modulated/encoded data from the modem subsystem 412 (on outbound transmissions) or of transmissions originating from another source such as a UE 212 and 222 or a BS 210 and 220. The RF unit 414 may be further configured to perform analog beamforming in conjunction with the digital beamforming. Although shown as integrated together in transceiver 410, the modem subsystem 412 and the RF unit 414 may be separate devices that are coupled together at the UE 115, 212, or 222 to enable the UE 115, 212, or 222 to communicate with other devices.

The RF unit 414 may provide the modulated and/or processed data, e.g. data packets (or, more generally, data messages that may contain one or more data packets and other information), to the antennas 416 for transmission to one or more other devices. This may include, for example, transmission of spectrum reservation signals, CSI-RSs, SRSs, service request signals according to embodiments of the present disclosure. The antennas 416 may further receive data messages transmitted from other devices. The antennas 416 may provide the received data messages for processing and/or demodulation at the transceiver 410. The antennas 416 may include multiple antennas of similar or different designs in order to sustain multiple transmission links. The RF unit 414 may configure the antennas 416.

Figure 5:
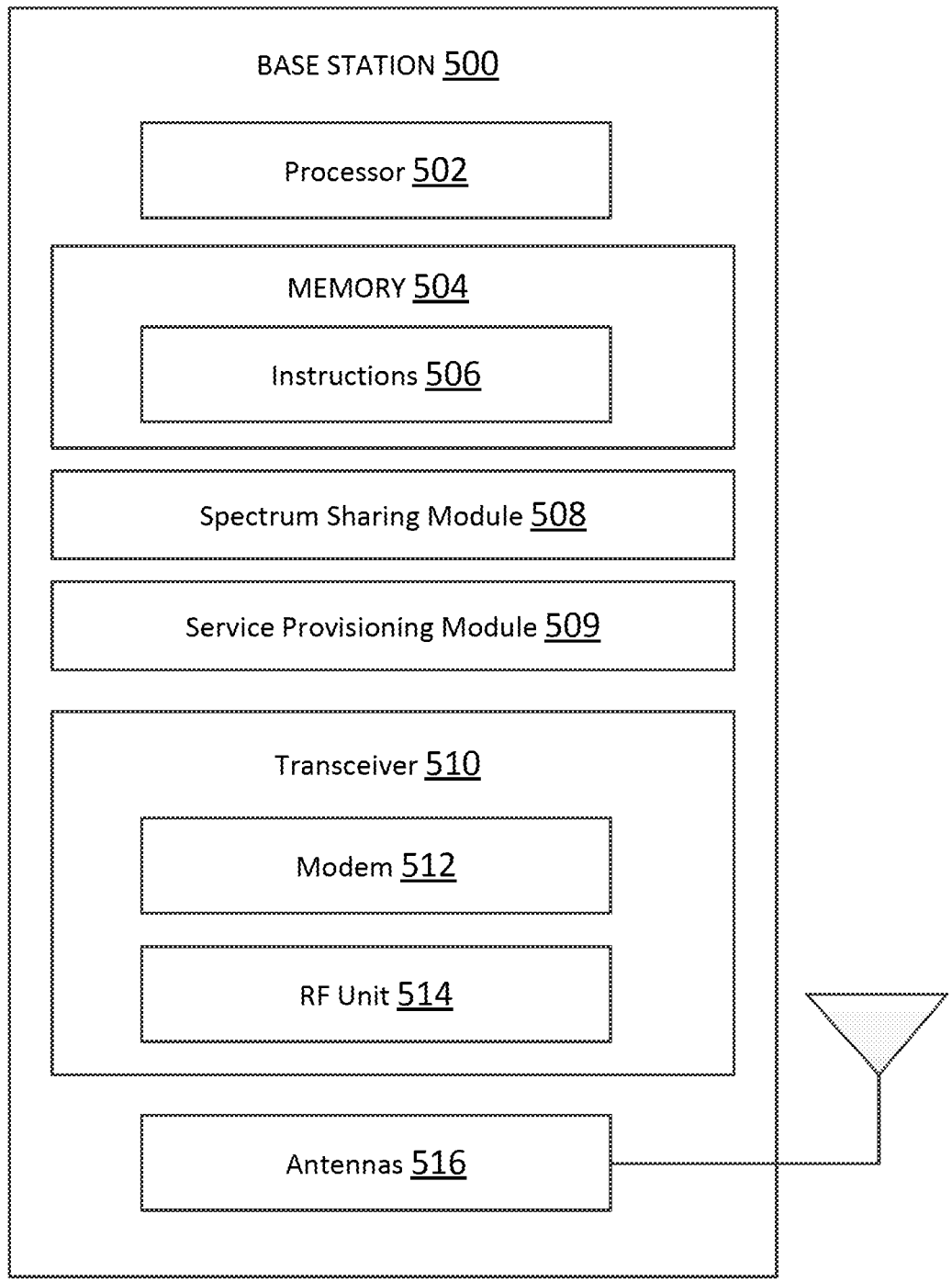
FIG. 5 is a block diagram of an exemplary base station (BS) according to embodiments of the present disclosure.

FIG. 5 is a block diagram of an exemplary BS 500 according to embodiments of the present disclosure. The BS 500 may be a BS 105, 210, or 220 as discussed above. A shown, the BS 500 may include a processor 502, a memory 504, a spectrum sharing module 508, a service provisioning module 509, a transceiver 510 including a modem subsystem 512 and a RF unit 514, and one or more antennas 516. These elements may be in direct or indirect communication with each other, for example via one or more buses.

The processor 502 may have various features as a specific-type processor. For example, these may include a CPU, a DSP, an ASIC, a controller, a FPGA device, another hardware device, a firmware device, or any combination thereof configured to perform the operations described herein. The processor 502 may also be implemented as a combination of computing devices, e.g., a combination of a DSP and a microprocessor, a plurality of microprocessors, one or more microprocessors in conjunction with a DSP core, or any other such configuration.

The memory 504 may include a cache memory (e.g., a cache memory of the processor 502), RAM, MRAM, ROM, PROM, EPROM, EEPROM, flash memory, a solid state memory device, one or more hard disk drives, memristor-based arrays, other forms of volatile and non-volatile memory, or a combination of different types of memory. In some embodiments, the memory 504 may include a non-transitory computer-readable medium. The memory 504 may store instructions 506. The instructions 506 may include instructions that, when executed by the processor 502, cause the processor 502 to perform operations described herein. Instructions 506 may also be referred to as code, which may be interpreted broadly to include any type of computer-readable statement(s) as discussed above with respect to FIG. 5.

The spectrum sharing module 508 and the service provisioning module 509 may be used for various aspects of the present disclosure. In an embodiment, when the BS 500 functions as a local operator BS (e.g., the BS 220), the spectrum sharing module 508 is configured to request resources from a spectrum owner for service advertising and delivery and receive resource allocations from the spectrum owner. The service provisioning module 509 is configured to advertise and deliver local services based on the resource allocations, as described in greater detail herein.

In an embodiment, when the BS 500 functions as a spectrum owner BS (e.g., the BSs 210), the spectrum sharing module 508 is configured to coordinate with a spectrum owner server to allocate resources in a spectrum for a local operating entity to advertise and deliver services using the spectrum. The service provisioning module 509 is configured to broadcast network information (e.g., PSS, SSS, MIBs, SIBs, and local service advertising time periods)

and/or facilitate service delivery from local operating entities, as described in greater detail herein.

As shown, the transceiver 510 may include the modem subsystem 512 and the RF unit 514. The transceiver 510 can be configured to communicate bi-directionally with other devices, such as the UEs 115, 212, and 222 and/or another core network element. The modem subsystem 512 may be configured to modulate and/or encode data according to a MCS, e.g., a LDPC coding scheme, a turbo coding scheme, a convolutional coding scheme, a digital beamforming scheme, etc. The RF unit 514 may be configured to process (e.g., perform analog to digital conversion or digital to analog conversion, etc.) modulated/encoded data from the modem subsystem 512 (on outbound transmissions) or of transmissions originating from another source such as a UE 212 or 222. The RF unit 514 may be further configured to perform analog beamforming in conjunction with the digital beamforming. Although shown as integrated together in transceiver 510, the modem subsystem 512 and the RF unit 514 may be separate devices that are coupled together at the BS 105 to enable the BS 105 to communicate with other devices.

The RF unit 514 may provide the modulated and/or processed data, e.g. data packets (or, more generally, data messages that may contain one or more data packets and other information), to the antennas 516 for transmission to one or more other devices. This may include, for example, transmission of information to complete attachment to a network and communication with a camped UE 212 according to embodiments of the present disclosure. The antennas 516 may further receive data messages transmitted from other devices and provide the received data messages for processing and/or demodulation at the transceiver 510. The antennas 516 may include multiple antennas of similar or different designs in order to sustain multiple transmission links.

Figure 6:
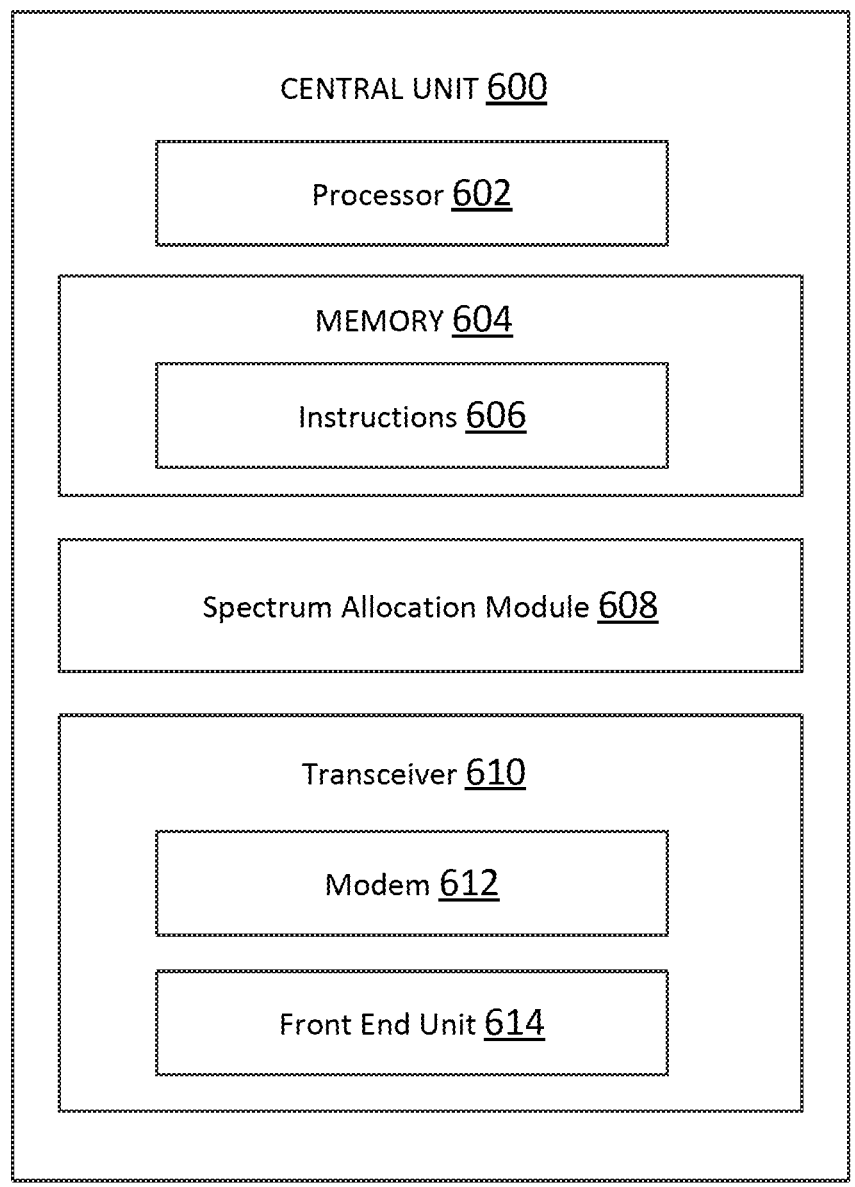
FIG. 6 is a block diagram of an exemplary central unit according to embodiments of the present disclosure.

FIG. 6 illustrates a block diagram of an exemplary central unit 600 according to embodiments of the present disclosure. The central unit 600 may be a spectrum owner server, a central unit 240 or a controlling entity of a spectrum as discussed above. A shown, the central unit 600 may include a processor 602, a memory 604, a spectrum allocation module 608, and a transceiver 610 including a modem subsystem 612 and a frontend unit 614. These elements may be in direct or indirect communication with each other, for example via one or more buses.

The processor 602 may have various features as a specific-type processor. For example, these may include a CPU, a DSP, an ASIC, a controller, a FPGA device, another hardware device, a firmware device, or any combination thereof configured to perform the operations described herein. The processor 602 may also be implemented as a combination of computing devices, e.g., a combination of a DSP and a microprocessor, a plurality of microprocessors, one or more microprocessors in conjunction with a DSP core, or any other such configuration.

The memory 604 may include a cache memory (e.g., a cache memory of the processor 602), RAM, MRAM, ROM, PROM, EPROM, EEPROM, flash memory, a solid state memory device, one or more hard disk drives, memristor-based arrays, other forms of volatile and non-volatile memory, or a combination of different types of memory. In some embodiments, the memory 604 may include a non-transitory computer-readable medium. The memory 604 may store instructions 606. The instructions 606 may include instructions that, when executed by the processor 602, cause the processor 602 to perform operations described herein. Instructions 606 may also be referred to as code, which may be interpreted broadly to include any type of computer-readable statement(s) as discussed above with respect to FIG. 6.

The spectrum allocation module 608 may be used for various aspects of the present disclosure. For example, the spectrum allocation module 608 is configured to receive spectrum use requests for service advertising and/or delivery, determine spectrum allocation, and grant or deny spectrum use requests, as described in greater detail herein.

As shown, the transceiver 610 may include the modem subsystem 612 and the frontend unit 614. The transceiver 610 can be configured to communicate bi-directionally with other devices, such as the BSs 105, 210, and 220 and/or another core network element. The modem subsystem 612 may be configured to modulate and/or encode data according to a MCS, e.g., a LDPC coding scheme, a turbo coding scheme, a convolutional coding scheme, etc. The frontend unit 614 may include electrical-to-optical (E/O) components and/or optical-to-electrical (O/E) components that convert an electrical signal to an optical signal for transmission to a BS such as the BSs 105, 210, and 220 and/or receive an optical signal from the BS and convert the optical signal into an electrical signal, respectively. The frontend unit 614 may be configured to process (e.g., perform analog to digital conversion or digital to analog conversion, optical to electrical conversion or electrical to optical conversion, etc.) modulated/encoded data from the modem subsystem 612 (on outbound transmissions) or of transmissions originating from another source such as a backend or core network. Although shown as integrated together in transceiver 610, the modem subsystem 612 and the frontend unit 614 may be separate devices that are coupled together at the central unit 600 to enable the central unit 600 to communicate with other devices. The frontend unit 614 may transmit optical signal carrying the modulated and/or processed data over an optical link such as the links 242. The frontend unit 614 may further receive optical signals carrying data messages and provide the received data messages for processing and/or demodulation at the transceiver 610.

Figure 7:
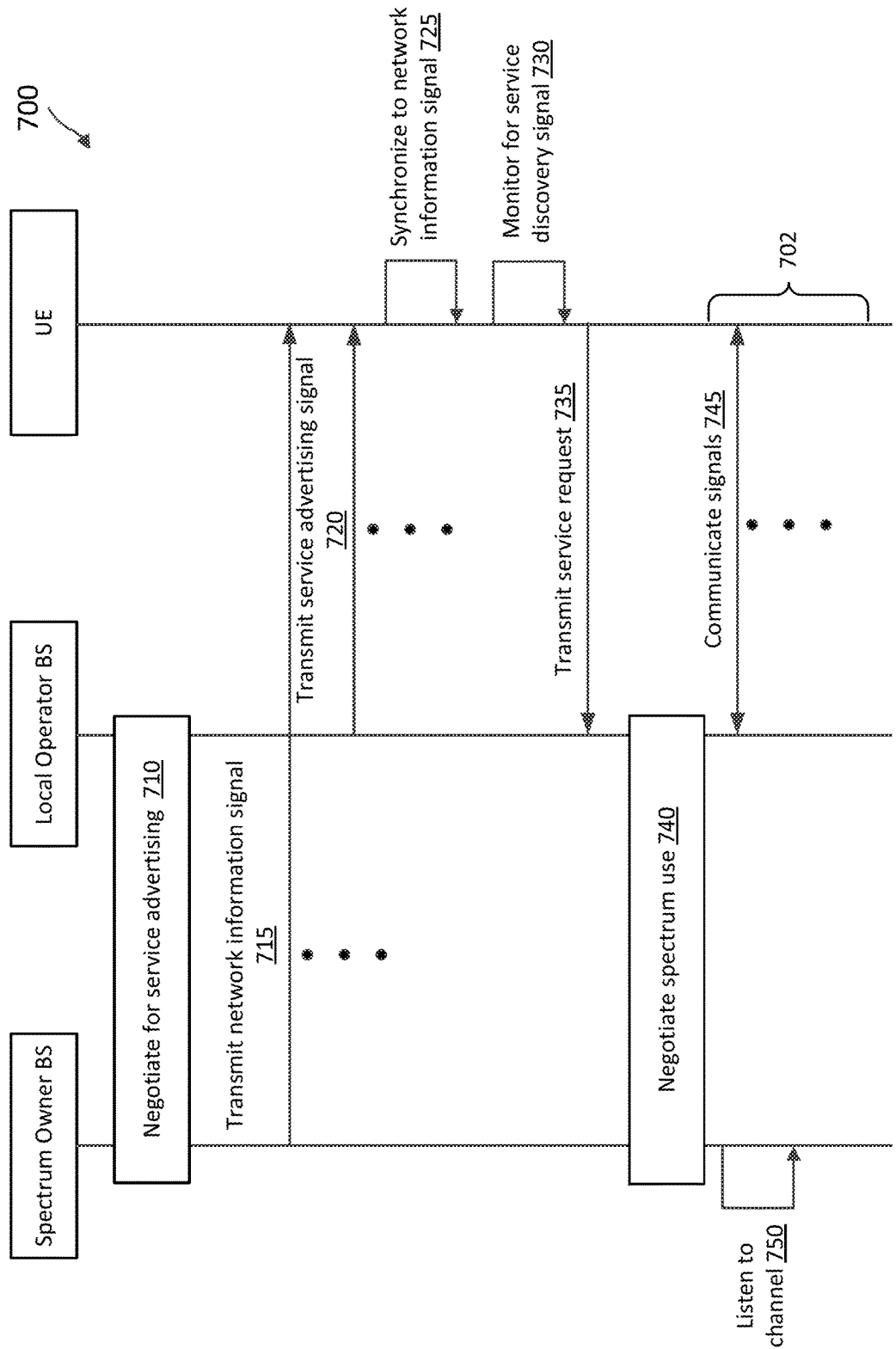
FIG. 7 a signaling diagram of a synchronous service advertising and discovery method according to embodiments of the present disclosure.

FIG. 7 is a signaling diagram of a synchronous service advertising and discovery method 700 according to embodiments of the present disclosure. The method 700 is implemented among a spectrum owner BS, a local operator BS, and a UE. The spectrum operator BS and the local operator BS may be similar to the BSs 105, 210, 220, and 500. The UE may be similar to the UEs 115, 212, 222, and 400. For instance, in the context of the network 200, the spectrum operator BS may correspond to the BS 210b, the local operator BS may correspond to the BS 220, and the UE may correspond to the UE 222. Steps of the method 700 can be executed by computing devices (e.g., a processor, processing circuit, and/or other suitable component) of the spectrum owner BS, the local operator BS, and the UE. As illustrated, the method 700 includes a number of enumerated steps, but embodiments of the method 700 may include additional steps before, after, and in between the enumerated steps. In some embodiments, one or more of the enumerated steps may be omitted or performed in a different order.

In the method 700, the spectrum owner BS, the local operator BS, and the UE are time synchronized. The local operator BS advertises services in a spectrum (e.g., the spectrum 301) using resources allocated by a spectrum owner or a controlling entity of the spectrum that operates the spectrum owner BS.

At step 710, the local operator BS negotiates resources with the spectrum owner BS for service advertising in a spectrum (e.g., the spectrum 301) of the spectrum owner BS. The negotiation may be communicated via spectrum owner server or a controlling entity of the spectrum over a backhaul link (e.g., the backhaul links 132 and 242). The negotiation may include time periods, transmission periodicities, pricing, and/or other agreements. For example, the spectrum owner may grant certain time periods at a certain periodicities for the local operator BS for service advertising. Mechanisms for the negotiation are described in greater detail herein.

At step 715, the spectrum owner BS transmits a network information signal in the spectrum, for example, in a broadcast mode. The network information signal may be similar to the PBCH signals in LTE. The network information signal may include synchronization signals (e.g., PSS and SSS), system information (e.g., MIBs and SIBs), and/or local service advertising time periods. The local service advertising periods correspond to time periods negotiated in the step 710. In some embodiments, multiple local operating entities may negotiate with the spectrum owner for service advertising resources. The network information signal may indicate local service advertising time periods and/or periodicities allocated for all local operating entities. The spectrum owner BS may transmit the network information signal periodically. In an embodiment, the network information signals may reach a wide coverage area, and thus allows a local operator network to leverage the network information signals instead of transmitting separate network information signals and/or synchronization signals.

At step 720, the local operator BS transmits a service advertising signal in the spectrum, for example, in a broadcast mode, based on the time periods allocated by the spectrum owner in the step 710. The service advertising signal may indicate an availability of a service provided by the local operator. For example, the local operator BS may synchronize the local operator BS timings to the network information signals of the spectrum owner BS. The timings of the network information signals and the service advertising signals are described in greater detail herein. The local operator BS may transmit the service advertising signal periodically based on the negotiation.

At step 725, the UE synchronizes to the network information signal (e.g., the PSS and the SSS) of the spectrum owner BS. The UE may also obtain network information from the network information signal. For example, the UE may obtain local service advertising time periods from the network information signal. The UE may also perform random access channel (RACH) procedures with the spectrum owner BS to obtain timing advance information.

At step 730, the UE monitors for a service advertising signal from a local operator, for example, based on the local service advertising time periods indicated by the network information signal. For example, the UE may detect the service advertising signal from the local operator BS.

At step 735, the UE transmits a service request to the local operator BS based on the service advertising signal. In an embodiment, the service request may include multiple message exchanges between the UE and the local operator BS.

At step 740, the local operator BS negotiates resources with the spectrum owner BS for a temporary use of the spectrum for service delivery based on the service request. The negotiation may be communicated via the backhaul (e.g., to a spectrum owner server) and may include a time period 702 (e.g., the time period 340) and/or pricing. The time period 702 may correspond to a communication session for serving the UE.

At step 745, the local operator BS and the UE may communicate traffic with each other in the spectrum during the negotiated time period 702, for example, as a primary user of the spectrum.

At step 750, the spectrum owner BS may listen to the channel (e.g., the spectrum), during the negotiated time period 702, for example, functioning as a secondary user of the spectrum and opportunistically use the spectrum when the local operator BS is not using the spectrum.

As can be seen in the method 700, the spectrum owner BS, the local operator BS, and the UE are time synchronized and the local operator BS advertise services in the spectrum based on an allocation from the spectrum owner. Thus, the method 700 may be referred to as a synchronous-in-band service discovery method.

Figure 8:
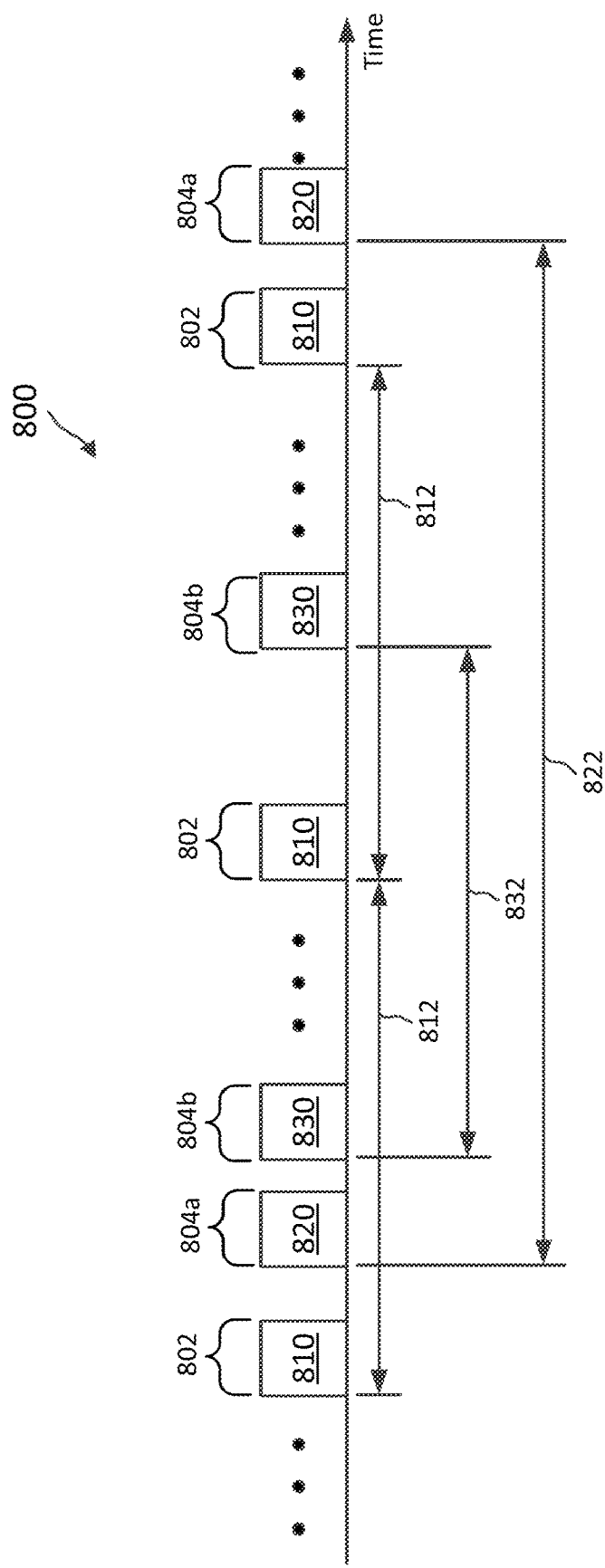
FIG. 8 is a timing diagram illustrating a broadcast channel transmission scenario according to embodiments of the present disclosure.

FIG. 8 is a timing diagram illustrating a broadcast channel transmission scenario 800 according to embodiments of the present disclosure. In FIG. 8, the x-axis represents time in some constant units. The scenario 800 may correspond to the network information signal transmissions of the spectrum owner BS and the service advertising signal transmissions of the local operator BS in the method 700.

As an example, a spectrum owner BS may transmit network information signals 810 (e.g., PSS and/or SSS) in time periods 802 with a periodicity 812. The spectrum owner may allocate time periods 804 for local service advertising. The spectrum owner may allocate a transmission periodicity 822 to a first local operating entity for transmitting service advertising signals 820 and another transmission periodicity 832 to a second local operating entity for transmitting service advertising signals 830. Thus, the time periods 804a are dedicated time periods for the first local operating entity and the time periods 804b are dedicated time periods for the second local operating entity.

The spectrum owner may configure the transmission periodicities 812, 822, and 832 to any be any suitable periodicities. For example, the network information signal 810 may be a synchronization signal and the periodicity 812 may be about 5 milliseconds (ms) or about 10 ms. The spectrum owner may allocate local service advertising time periods 804 at intervals of about 20 ms. The spectrum owner may allocate a local service discovery transmission periodicity 822 of about 40 ms for the first network operating entity and a local service discovery transmission periodicity 832 of about 100 ms for the second network operating entity. The spectrum owner may configure the transmission periodicities 822 and 832 based on a pricing negotiation with the corresponding first and second network operating entities and/or based on network conditions or traffic demands of the spectrum owner.

Figure 9:
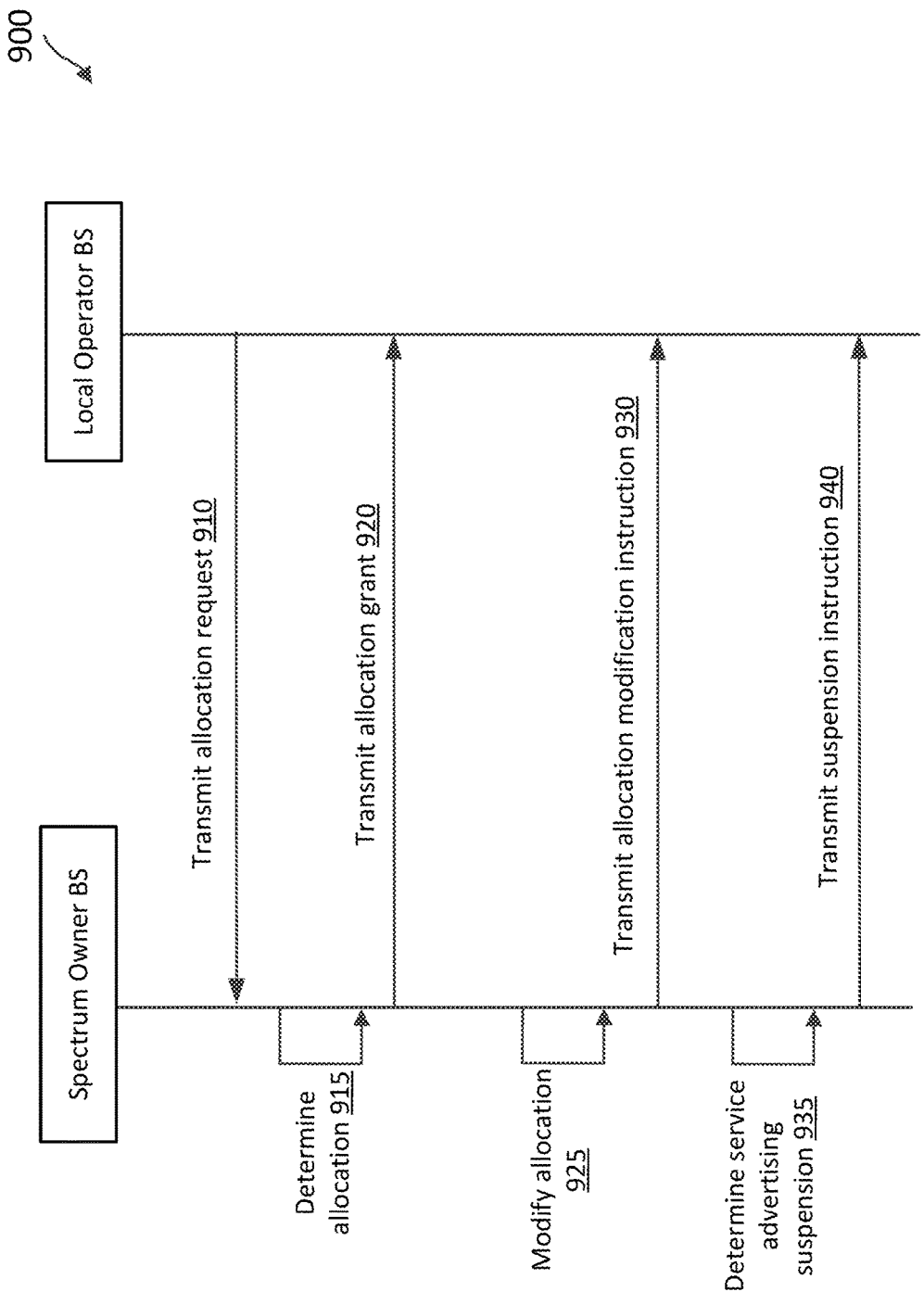
FIG. 9 is a signaling diagram of a spectrum allocation method according to embodiments of the present disclosure.

FIG. 9 is a signaling diagram of a spectrum allocation method 900 according to embodiments of the present disclosure. The method 900 is implemented between a spectrum owner BS and a local operator BS, and a UE. The spectrum operator BS and the local operator BS may be similar to the BSs 105, 210, 220, and 500. Steps of the method 900 can be executed by computing devices (e.g., a processor, processing circuit, and/or other suitable component) of the spectrum owner BS and the local operator BS. As illustrated, the method 900 includes a number of enumerated steps, but embodiments of the method 900 may include additional steps before, after, and in between the enumerated steps. In some embodiments, one or more of the enumerated steps may be omitted or performed in a different order.

In the method 900, the spectrum owner BS communicates with the local operator BS via a backhaul link (e.g., the backhaul links 132 and 242) and a controlling entity (e.g., the central units 240 and 600) of a spectrum of the spectrum owner BS.

At step 910, the local operator BS transmits an allocation request to the spectrum owner BS. For example, the allocation request may indicate a request to broadcast service availabilities (e.g., the signals 820 and 830) in a spectrum (e.g., the spectrum 301) controlled by the spectrum controlling entity.

At step 915, the spectrum owner BS determines an allocation in the spectrum for the local operator BS based on the allocation request, pricing agreements, and/or network conditions. The spectrum owner BS may coordinate with the controlling entity.

At step 920, the spectrum owner BS transmits an allocation grant to the local operator BS. The allocation grant may include a network configuration indicating time periods and/or transmission periodicities assigned to the local operator BS for service advertising.

In some embodiments, at step 925, the spectrum owner BS may dynamically modify the service advertising allocation. For example, when additional local operating entities requests for service advertising time periods, the spectrum owner BS may allocate a different service advertising time period and/or a different transmission periodicity to the local operator BS. At step 930, the spectrum owner BS transmits an allocation modification instruction to instruct the local operator BS to modify the service advertising signal transmission time period or periodicities based on the reconfiguration.

In some embodiments, at step 935, the spectrum owner BS may determine to suspend service advertising signal transmissions from the local operator BS, for example, due to network conditions or other agreements. At step 940, the spectrum owner BS transmits a service discovery suspension instruction to instruct the local operator BS to suspend service discovery transmissions in the spectrum.

In an embodiment, the steps 910, 915, and 920 may correspond to the negotiation in the step 710 in the method 700. In addition, the local operator BS may use substantially similar steps as the steps 910, 915, and 920 for the negotiation in the step 740 of the method 700. For example, the allocation request in the step 910 may alternatively indicate a request to use the spectrum temporarily for a period of time to deliver a service (e.g., the data 330) to a UE (e.g., the UEs 115, 222, 400) in proximity of the local operator BS.

Figure 10:
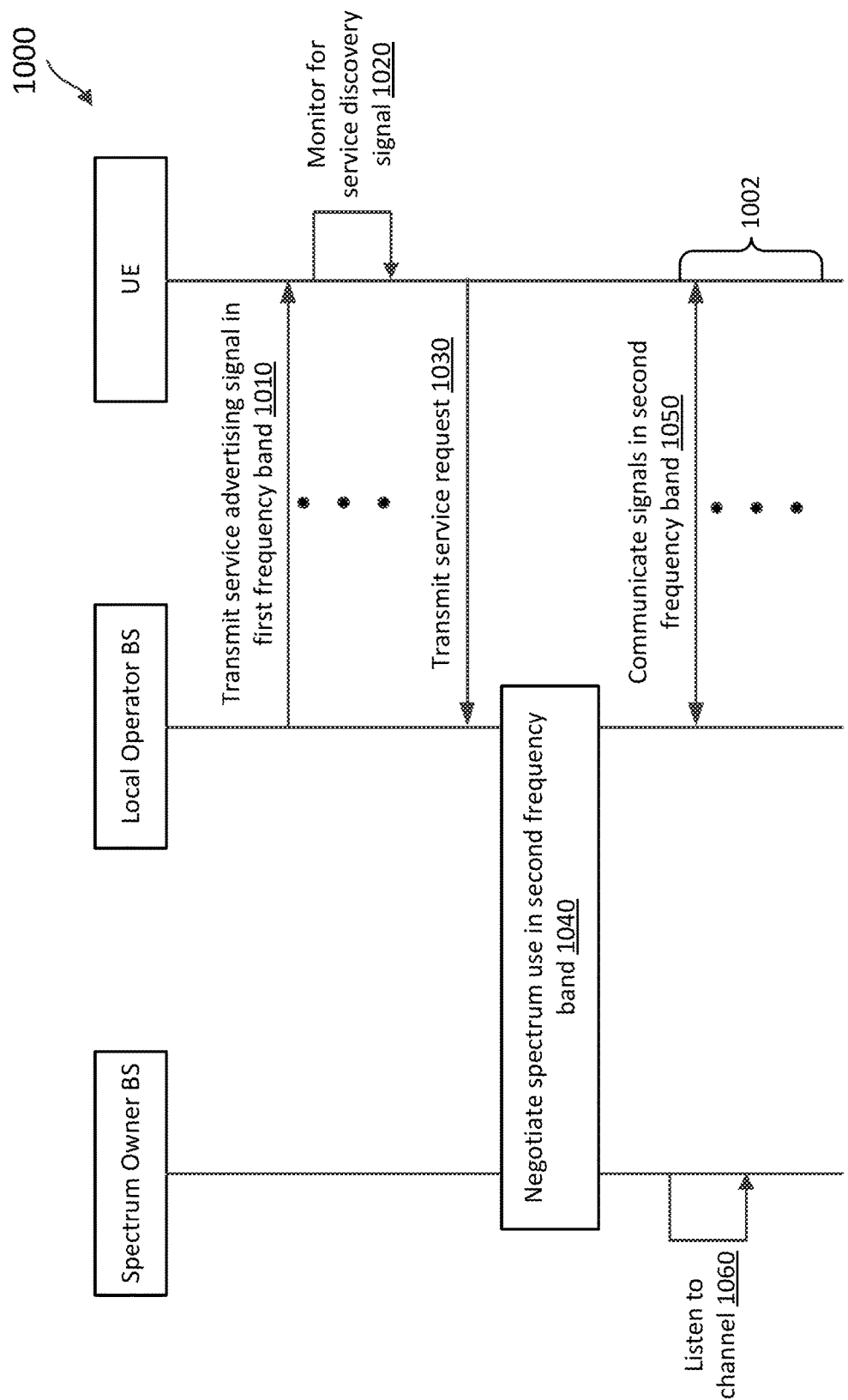
FIG. 10 a signaling diagram of an asynchronous service advertising and discovery method according to embodiments of the present disclosure.

FIG. 10 is a signaling diagram of an asynchronous service discovery method 1000 according to embodiments of the present disclosure. The method 1000 is implemented among a spectrum owner BS, a local operator BS, and a UE. The spectrum operator BS and the local operator BS may be similar to the BSs 105, 210, 220, and 500. The UE may be similar to the UEs 115, 212, 222, and 400. For instance, in the context of the network 200, the spectrum operator BS may correspond to the BS 210b, the local operator BS may correspond to the BS 220, and the UE may correspond to the UE 222. Steps of the method 1000 can be executed by computing devices (e.g., a processor, processing circuit, and/or other suitable component) of the spectrum owner BS, the local operator BS, and the UE. As illustrated, the method 1000 includes a number of enumerated steps, but embodiments of the method 1000 may include additional steps before, after, and in between the enumerated steps. In some embodiments, one or more of the enumerated steps may be omitted or performed in a different order.

In the method 1000, the local operator BS advertises a service in a common spectrum (e.g., an unlicensed spectrum or a shared spectrum) available for communications at least by the local operator BS and the UE and delivers the service in another spectrum (e.g., the spectrum 301) that is controlled by a spectrum owner or a controlling entity of the spectrum that operates the spectrum owner BS. Thus, the service advertising or discovery is asynchronous with respect to the spectrum owner BS.

At step 1010, the local operator BS transmits a service advertising signal in a first frequency band. The first frequency band may be an unlicensed spectrum (e.g., a WiFi spectrum) or a shared spectrum (e.g., a 3.5 GHz spectrum) different than a second frequency band (e.g., the spectrum 301) owned by a spectrum owner operating the spectrum owner BS. The service advertising signal may indicate an available of a service provided by the local operator BS. When the first frequency band is in a WiFi spectrum, the service advertising signal may indicate an SSID of the service in a WLAN. When the first frequency band is in a 3.5 GHz spectrum, the local operator BS may function as GAA tier and may advertise the services when the channel is idle.

At step 1020, the UE monitors for a service advertising signal from a local operator in the first frequency band. For example, the UE may detect the service advertising signal from the local operator BS.

At step 1030, the UE transmits a service request to the local operator BS based on the service advertising signal. The service request may include multiple message exchanges between the UE and the local operator BS.

At step 1040, the local operator BS negotiates resources with the spectrum owner BS for a temporary use of the second frequency band for service delivery based on the service request. The negotiation may be communicated via the backhaul (e.g., to a spectrum owner server) and may include a time period 1002 (e.g., the time period 340) and/or pricing. The time period 1002 may correspond to a communication session for serving the UE.

At step 1050, the local operator BS and the UE may communicate traffic with each other in the spectrum during the negotiated time period 1002, for example, as a primary user of the spectrum.

At step 1060, the spectrum owner BS may listen to the channel (e.g., the spectrum), during the negotiated time period 1002, for example, functioning as a secondary user of the spectrum and opportunistically use the spectrum when the local operator BS is not using the spectrum.

While the method 1000 illustrates service delivery in the second frequency band, in some embodiments, the local operator BS may deliver a portion of the service in the first frequency band prior to switching to the second frequency band.

Figure 11:
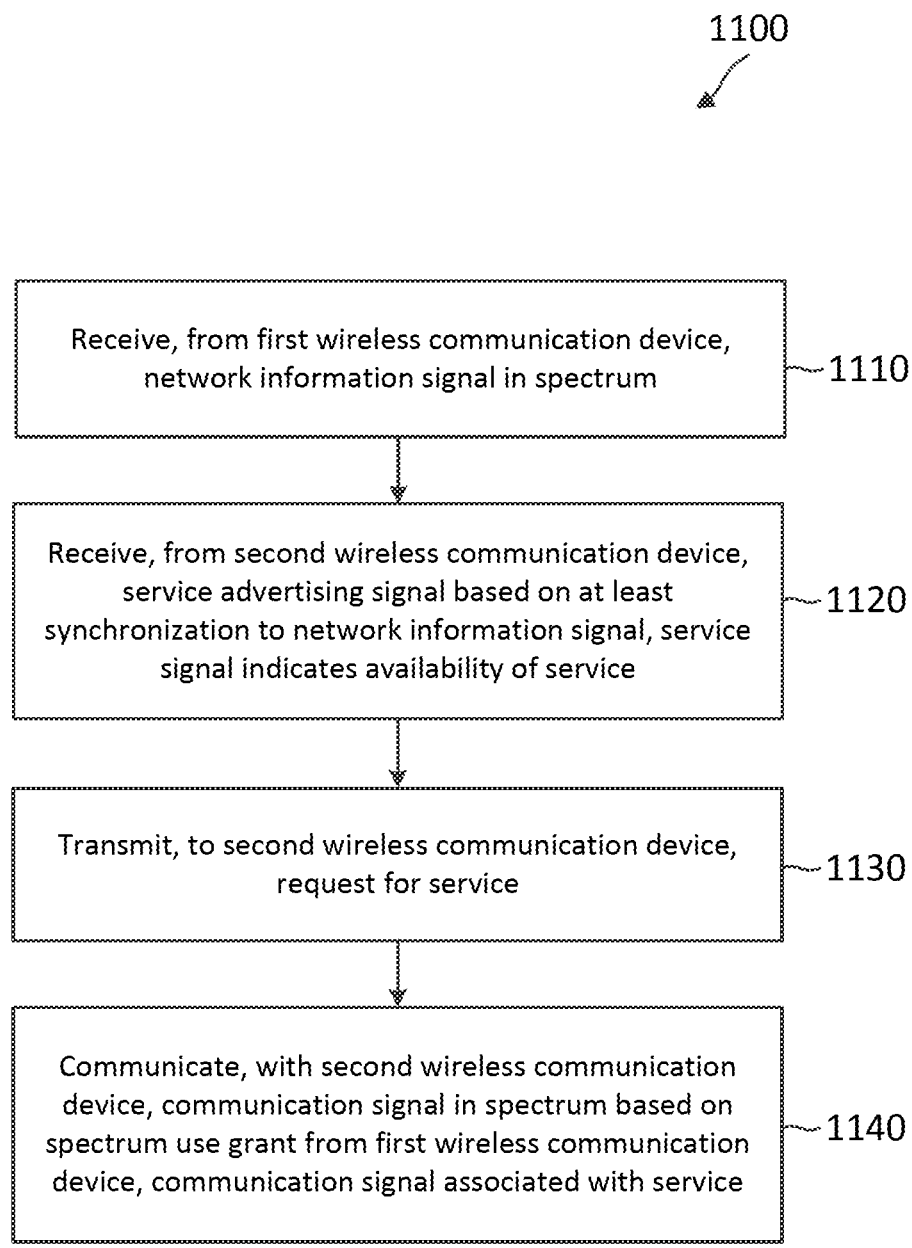
FIG. 11 is a flow diagram of a synchronous service discovery method according to embodiments of the present disclosure.

FIG. 11 is a flow diagram of a synchronous service discovery method 1100 according to embodiments of the present disclosure. Steps of the method 1100 can be executed by a computing device (e.g., a processor, processing circuit, and/or other suitable component) of a wireless communication device, such as the UEs 115, 222, 222, and 400. The method 1100 may employ similar mechanisms as in the methods 700 and 900 described with respect to FIGS. 7 and 9, respectively. As illustrated, the method 1100 includes a number of enumerated steps, but embodiments of the method 1100 may include additional steps before, after, and in between the enumerated steps. In some embodiments, one or more of the enumerated steps may be omitted or performed in a different order.

At step 1110, the method 1100 includes receiving, from a first wireless communication device, a network information signal (e.g., the network information signal 810) in a spectrum (e.g., the spectrum 301). The first wireless communication device may be associated with a controlling entity of the spectrum. For example, the first wireless communication device may be a spectrum owner BS (e.g., the BSs 210).

At step 1120, the method 1100 includes receiving, from a second wireless communication device, a service advertising signal based on at least a synchronization to the network information signal. The second wireless communication device may be associated with a local operating entity. For example, the second wireless communication device is a local operator BS (e.g., the BS 220). The service advertising signal indicates an availability of a service provided by the local operating entity.

At step 1130, the method 1100 includes transmitting, to the second wireless communication device, a request for the service.

At step 1140, the method 1100 includes communicating, with the second wireless communication device, a communication signal in the spectrum based on a spectrum use grant from the first wireless communication device. The communication signal is associated with the service.

Figure 12:
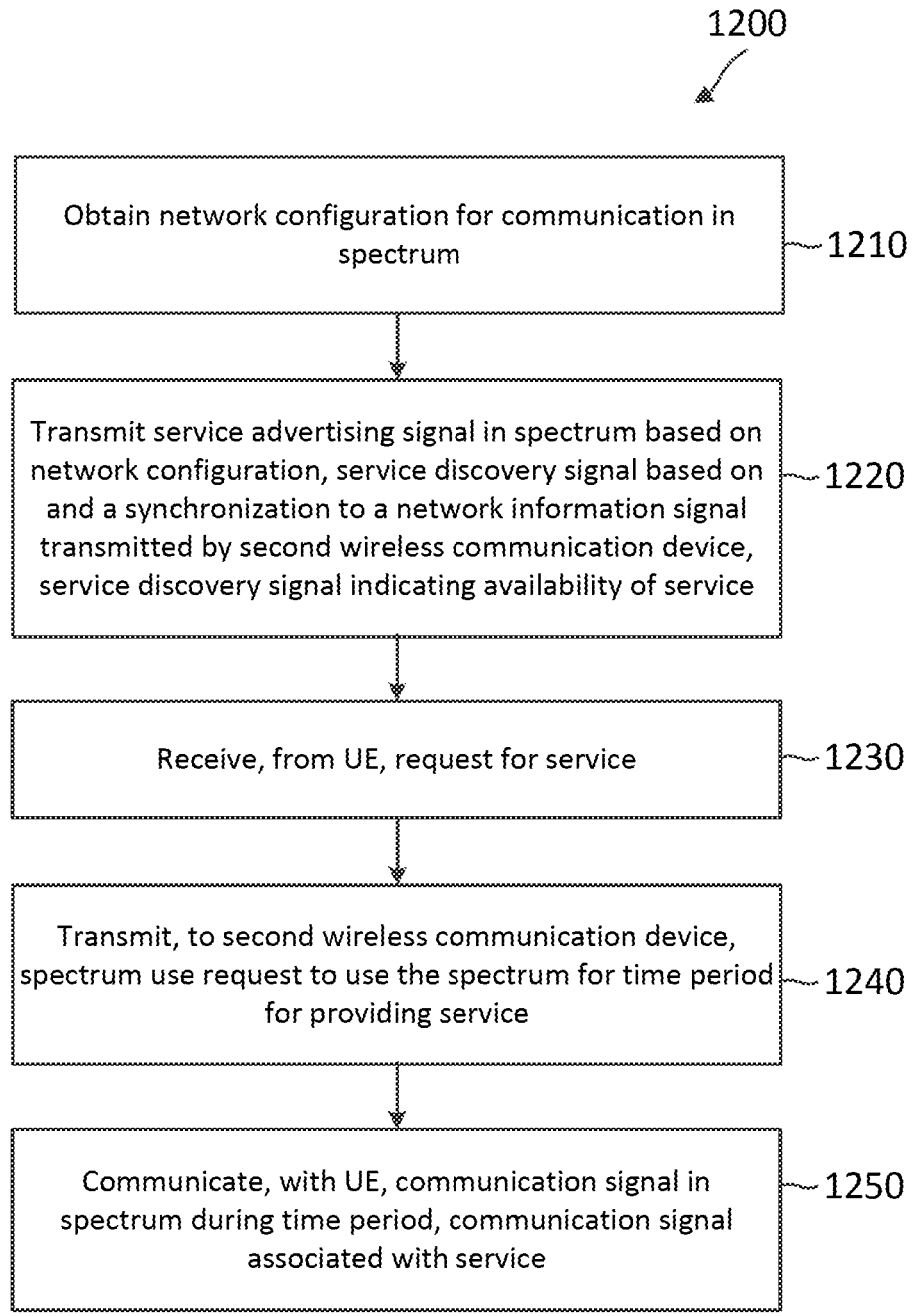
FIG. 12 is a flow diagram of a synchronous service provisioning method according to embodiments of the present disclosure.

FIG. 12 is a flow diagram of a synchronous service provisioning method 1200 according to embodiments of the present disclosure. Steps of the method 1200 can be executed by a computing device (e.g., a processor, processing circuit, and/or other suitable component) of a wireless communication device, such as the BSs 105, 220, and 500. The wireless communication device is associated with a local operating entity. For example, the wireless communication device is a local operator BS (e.g., the BS 220). The method 1200 may employ similar mechanisms as in the methods 700 and 900 described with respect to FIGS. 7 and 8, respectively. As illustrated, the method 1200 includes a number of enumerated steps, but embodiments of the method 1200 may include additional steps before, after, and in between the enumerated steps. In some embodiments, one or more of the enumerated steps may be omitted or performed in a different order.

At step 1210, the method 1200 includes obtaining a network configuration for communication in a spectrum (e.g., the spectrum 301). The network configuration may indicate a service advertising signal transmission time period allocated to the first wireless communication device. The network configuration may indicate a periodicity of the service advertising signal transmission time period.

At step 1220, the method 1200 includes transmitting a service advertising signal in the spectrum based on the network configuration. The service advertising signal is based on a synchronization to a network information signal transmitted by a second wireless communication device. The second wireless communication device is associated with a controlling entity of the spectrum. For example, the second wireless communication device is a spectrum operator BS (e.g., the spectrum operator BSs 210). The service advertising signal indicates an availability of a service provided by the local operating entity.

At step 1230, the method 1200 receives, from a UE (e.g., the UEs 115 and 222), a request for the service.

At step 1240, the method 1200 includes transmitting, to the second wireless communication device, a spectrum use request to use the spectrum for a time period (e.g., the time period 340 and 702) for providing the service.

At step 1250, the method 1200 includes communicating, with the UE, a communication signal in the spectrum during the time period. The communication signal is associated with the service.

Figure 13:
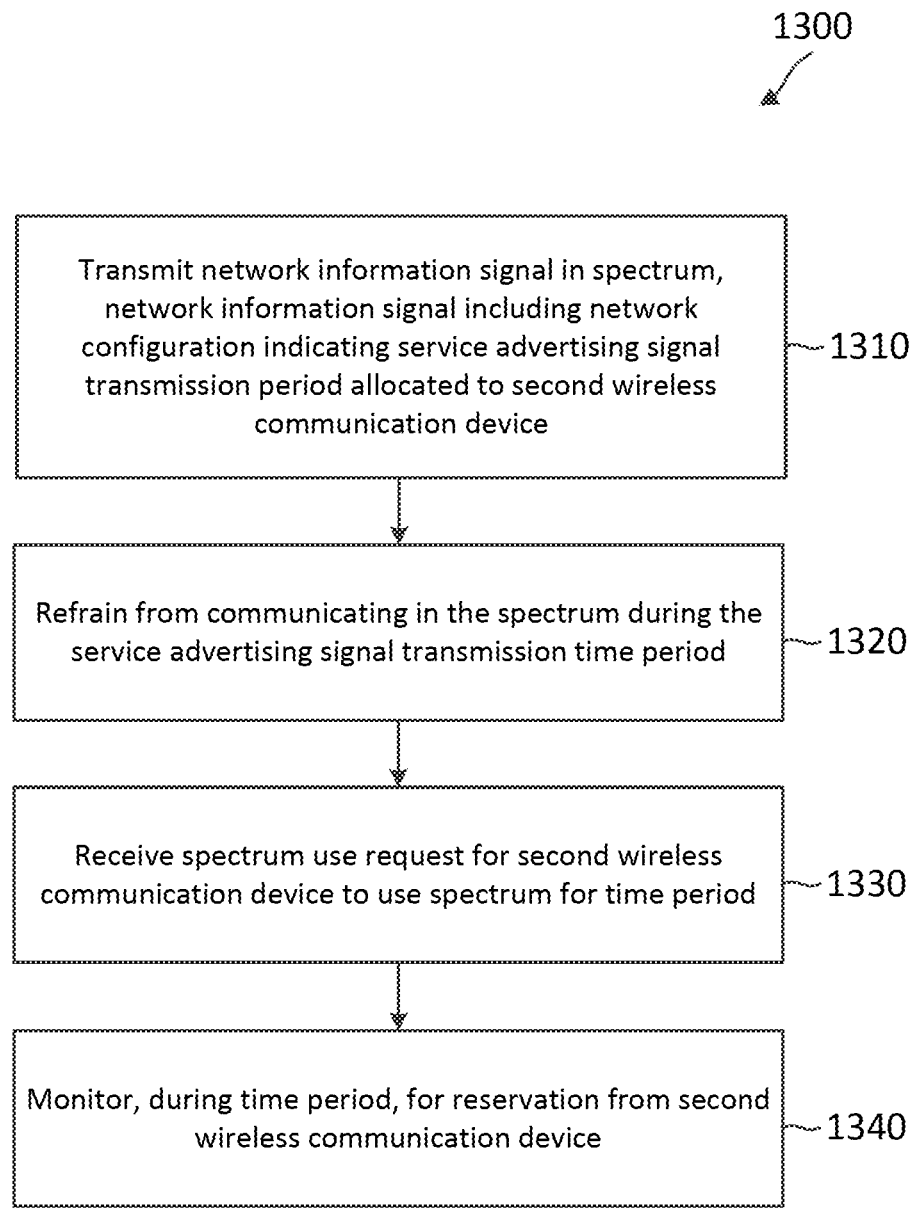
FIG. 13 is a flow diagram of a spectrum allocation method according to embodiments of the present disclosure.

FIG. 13 is a flow diagram of a spectrum allocation method 1300 according to embodiments of the present disclosure. Steps of the method 1300 can be executed by a computing device (e.g., a processor, processing circuit, and/or other suitable component) of a wireless communication device, such as the BSs 105, 210, 220, and 500. The wireless communication device may be associated with a controlling entity of a spectrum (e.g., the spectrum 301). For example, the wireless communication device is a spectrum operator BS (e.g., the spectrum operator BS 210).). The method 1200 may employ similar mechanisms as in the methods 700 and 900 described with respect to FIGS. 7 and 8, respectively. As illustrated, the method 1300 includes a number of enumerated steps, but embodiments of the method 1300 may include additional steps before, after, and in between the enumerated steps. In some embodiments, one or more of the enumerated steps may be omitted or performed in a different order.

At step 1310, the method 1300 includes transmitting a network information signal (e.g., the network information signal 810) in the spectrum. The network information signal includes a network configuration indicating a service advertising signal transmission time period allocated to a second wireless communication device. The second wireless communication device is associated with a local operating entity. For example, the second wireless communication device is a local operator BS (e.g., the local operator BS 220).

At step 1320, the method 1300 includes refraining from communication in the spectrum during the service advertising signal transmission time period.

At step 1330, the method 1300 includes receiving a spectrum use request for the second wireless communication device to use the spectrum for a time period (e.g., the time periods 340 and 702).

At step 1340, the method 1300 includes monitoring, during the time period, for a reservation from the second wireless communication device.

Figure 14:
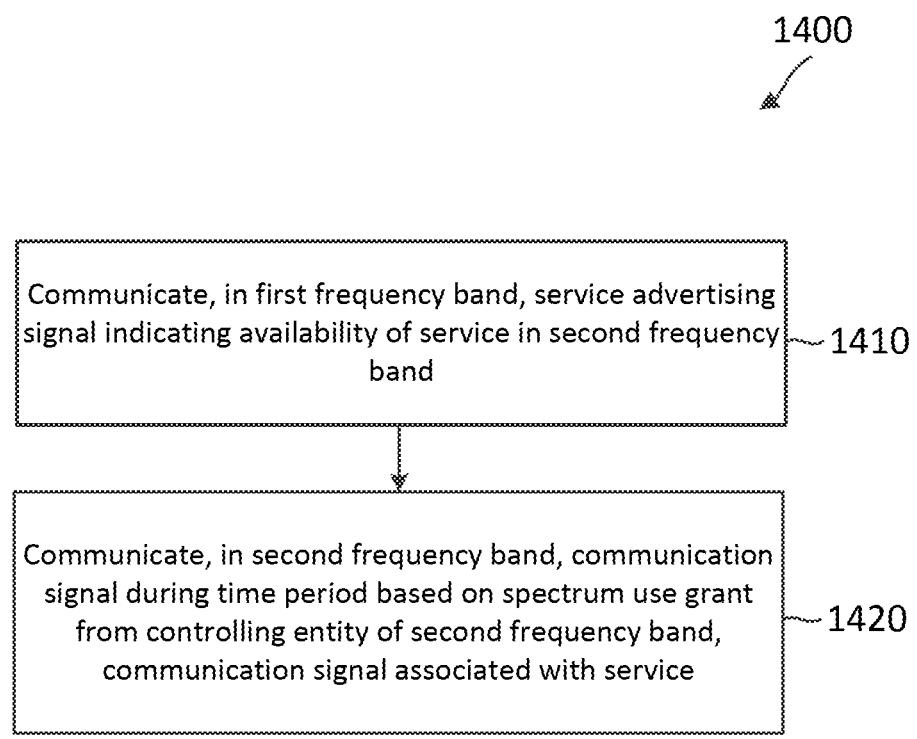
FIG. 14 is a flow diagram of an asynchronous service advertising and discovery method according to embodiments of the present disclosure.

FIG. 14 is a flow diagram of an asynchronous service advertising and discovery method 1400 according to embodiments of the present disclosure. Steps of the method 1400 can be executed by a computing device (e.g., a processor, processing circuit, and/or other suitable component) of a wireless communication device, such as the BSs 105, 210, 220, and 500 and the UEs 115, 222, and 400. The method 1400 may employ similar mechanisms as in method 1000 described with respect to FIG. 10. As illustrated, the method 1400 includes a number of enumerated steps, but embodiments of the method 1400 may include additional steps before, after, and in between the enumerated steps. In some embodiments, one or more of the enumerated steps may be omitted or performed in a different order.

At step 1410, the method 1400 includes communicating, in a first frequency band, a service advertising signal indicating an availability of a service provided by a local operating entity. The first frequency band may be in an unlicensed spectrum or a shared spectrum.

At step 1420, the method 1400 includes communicating, in a second frequency band, a communication signal during a time period (e.g., the time periods 340 and 1002) based on a spectrum use grant from a controlling entity of the second frequency band. The second frequency band is in a spectrum (e.g., the spectrum 301) controlled by the controlling entity. The communication signal associated with the service.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of [at least one of A, B, or C] means A or B or C or AB or AC or BC or ABC (i.e., A and B and C).

Further embodiments of the present disclosure include a method of wireless communication, comprising receiving, by a user equipment (UE) from a first wireless communication device, a network information signal in a spectrum; receiving, by the UE from a second wireless communication device, a service advertising signal based on at least a synchronization to the network information signal, the service advertising signal indicating an availability of a service; and transmitting, by the UE to the second wireless communication device, a request for the service, wherein the first wireless communication device and the second wireless communication device are associated with different operating entities of the spectrum.

In some embodiments, wherein the first wireless communication device is associated with a controlling entity of the spectrum, wherein the second wireless communication device is associated with a local operating entity of the spectrum, and wherein the UE is positioned in a geographic coverage area of the second wireless communication device. In some embodiments, wherein the network information signal indicates a service advertising signal transmission time period, and wherein the method further comprises monitoring for the service advertising signal during the service advertising signal transmission time period. In some embodiments, wherein the network information signal indicates a periodicity of the service advertising signal transmission time period. In some embodiments, wherein the network information signal includes a synchronization signal, and wherein the periodicity of the service advertising signal transmission time period is different from a transmission periodicity of the synchronization signal. In some embodiments, the method further comprises receiving, by the UE from the first wireless communication device, another network information channel signal indicating a modification to the periodicity of the service advertising signal transmission time period. In some embodiments, the method further comprises communicating, by the UE with the second wireless communication device, a communication signal in the spectrum based on a spectrum use grant from the first wireless communication device, the communication signal associated with the service.

Further embodiments of the present disclosure include a method of wireless communication, comprising obtaining, by a first wireless communication device, a network configuration for communication in a spectrum; transmitting, by the first wireless communication device, a service advertising signal in the spectrum based on the network configuration, the service advertising signal being based on a synchronization to a network information signal transmitted by a second wireless communication device, the service advertising signal indicating an availability of a service; and receiving, by the first wireless communication device from a user equipment (UE), a request for the service, wherein the first wireless communication device and the second wireless communication device are associated with different operating entities of the spectrum.

In some embodiments, wherein the first wireless communication device is associated with a local operating entity of the spectrum, wherein the second wireless communication device is associated with a controlling entity of the spectrum, and wherein the UE is positioned in a geographic coverage area of the first wireless communication device. In some embodiments, wherein the obtaining includes requesting, by the first wireless communication device, an allocation in the spectrum for a service advertising signal transmission; and receiving, by the first wireless communication device, the network configuration indicating a service advertising signal transmission time period allocated to the first wireless communication device, and wherein the transmitting the service advertising signal includes transmitting the service advertising signal during the service advertising signal transmission time period. In some embodiments, wherein the network configuration further indicates a periodicity of the service advertising signal transmission time period. In some embodiments, wherein the network information signal includes a synchronization signal, and wherein the periodicity of the service advertising signal transmission time period is different from a transmission periodicity of the synchronization signal. In some embodiments, the method further comprises receiving, by the first wireless communication device, an instruction to modify the periodicity of the service advertising signal transmission time period. In some embodiments, the method further comprises receiving, by the first wireless communication device, an instruction to suspend a subsequent service advertising signal transmission. In some embodiments, the method further comprises requesting, by the first wireless communication device, an allocation in the spectrum for a time period to provide the service; and communicating, by the first wireless communication device with the UE, a communication signal in the spectrum during the time period, the communication signal associated with the service.

Further embodiments of the present disclosure include a method of wireless communication, comprising transmitting, by a first wireless communication device, a network information signal in a spectrum, the network information signal including at least a synchronization signal and an indication of a service advertising signal transmission time period allocated to a second wireless communication device; and refraining, by the first wireless communication device, from communicating in the spectrum during the service advertising signal transmission time period, wherein the first wireless communication device and the second wireless communication device are associated with different operating entities of the spectrum.

In some embodiments, wherein the first wireless communication device is associated with a controlling entity of the spectrum, and wherein the second wireless communication device is associated with a local operating entity of the spectrum. In some embodiments, the method further comprises receiving, by the first wireless communication device, a request for an allocation in the spectrum for the second wireless communication device to transmit a service advertising signal; and transmitting, by the first wireless communication device in response to the request, a grant indicating a service advertising signal transmission time period allocated to the second wireless communication device. In some embodiments, wherein the grant indicates a periodicity of the service advertising signal transmission time period. In some embodiments, wherein the network information signal includes a synchronization signal, and wherein the periodicity of the service advertising signal transmission time period is different from a transmission periodicity of the synchronization signal. In some embodiments, the method further comprises transmitting, by the first wireless communication device, an instruction to instruct the second wireless communication device to modify the periodicity of the service advertising signal transmission time period. In some embodiments, the method further comprises transmitting, by the first wireless communication device, an instruction to instruct the second wireless communication device to suspend a subsequent service advertising signal transmission. In some embodiments, the method further comprises receiving, by the first wireless communication device, a request for an allocation in the spectrum for a third wireless communication device to transmit a service advertising signal; and transmitting, by the first wireless communication device in response to the request, a grant indicating another service advertising signal transmission time period allocated to the third wireless communication device, wherein the second wireless communication device and the third wireless communication device are associated with different local operating entities. In some embodiments, the method further comprises receiving, by the first wireless communication device, a spectrum use request for the second wireless communication device to use the spectrum for a time period; and monitoring, by the first wireless communication device during the time period, for a reservation from the second wireless communication device.

Further embodiments of the present disclosure include a method of wireless communication, comprising communicating, by a first wireless communication device with a second wireless communication device in a first frequency band, a service advertising signal indicating an availability of a service in a second frequency band; and communicating, by the first wireless communication device with the second wireless communication device in the second frequency band, a communication signal during a time period based on a spectrum use grant from a controlling entity of the second frequency band, the communication signal associated with the service, wherein the first frequency band and the second frequency band are different.

In some embodiments, wherein at least one of the first wireless communication device or the second wireless communication device is associated with a local operating entity of the second frequency band. In some embodiments, wherein the communicating the service advertising signal includes transmitting, by the first wireless communication device, the service advertising signal, and wherein the method further comprises receiving, by the first wireless communication device from the second wireless communication device, a request for the service. In some embodiments, wherein the receiving the request includes receiving the request in the first frequency band. In some embodiments, wherein the receiving the request includes receiving the request in the second frequency band. In some embodiments, wherein the communicating the service advertising signal includes receiving, by the first wireless communication device from the second wireless communication device, the service advertising signal, and wherein the method further comprises transmitting, by the first wireless communication device to the second wireless communication device, a request for the service. In some embodiments, wherein the transmitting the request includes transmitting the request in the first frequency band. In some embodiments, wherein the transmitting the request includes transmitting the request in the second frequency band. In some embodiments, wherein the first frequency band is an unlicensed frequency band. In some embodiments, wherein the first frequency band is in a 3.5 gigahertz (GHz) spectrum.

Further embodiments of the present disclosure include an apparatus comprising a transceiver configured to receive, from a first wireless communication device, a network information signal in a spectrum; receive, from a second wireless communication device, a service advertising signal based on at least a synchronization to the network information signal, the service advertising signal indicating an availability of a service; and transmit, to the second wireless communication device, a request for the service, wherein the first wireless communication device and the second wireless communication device are associated with different operating entities of the spectrum.

In some embodiments, wherein the first wireless communication device is associated with a controlling entity of the spectrum, wherein the second wireless communication device is associated with a local operating entity of the spectrum, and wherein the apparatus is positioned in a geographic coverage area of the second wireless communication device. In some embodiments, wherein the network information signal indicates a service advertising signal transmission time period, and wherein the apparatus further comprises a processor configured to monitor for the service advertising signal during the service advertising signal transmission time period. In some embodiments, wherein the network information signal indicates a periodicity of the service advertising signal transmission time period. In some embodiments, wherein the network information signal includes a synchronization signal, and wherein the periodicity of the service advertising signal transmission time period is different from a transmission periodicity of the synchronization signal. In some embodiments, wherein the transceiver is further configured to receive, from the first wireless communication device, another network information channel signal indicating a modification to the periodicity of the service advertising signal transmission time period. In some embodiments, wherein the transceiver is further configured to communicate, with the second wireless communication device, a communication signal in the spectrum based on a spectrum use grant from the first wireless communication device, the communication signal associated with the service.

Further embodiments of the present disclosure include an apparatus comprising a processor configured to obtain a network configuration for communication in a spectrum; and a transceiver configured to transmit, a service advertising signal in the spectrum based on the network configuration, the service advertising signal being based on a synchronization to a network information signal transmitted by a second wireless communication device, the service advertising signal indicating an availability of a service; and receive, from a user equipment (UE), a request for the service, wherein the apparatus and the second wireless communication device are associated with different operating entities of the spectrum.

In some embodiments, wherein the apparatus is associated with a local operating entity of the spectrum, wherein the second wireless communication device is associated with a controlling entity of the spectrum, and wherein the UE is positioned in a geographic coverage area of the apparatus. In some embodiments, wherein the processor is further configured to obtain the network configuration by requesting an allocation in the spectrum for a service advertising signal transmission; and receiving the network configuration indicating a service advertising signal transmission time period allocated to the apparatus, and wherein the service advertising signal is transmitted during the service advertising signal transmission time period. In some embodiments, wherein the network configuration further indicates a periodicity of the service advertising signal transmission time period. In some embodiments, wherein the network information signal includes a synchronization signal, and wherein the periodicity of the service advertising signal transmission time period is different from a transmission periodicity of the synchronization signal. In some embodiments, wherein the transceiver is further configured to receive an instruction to modify the periodicity of the service advertising signal transmission time period. In some embodiments, wherein the transceiver is further configured to receive an instruction to suspend a subsequent service advertising signal transmission. In some embodiments, wherein the transceiver is further configured to request an allocation in the spectrum for a time period to provide the service; and communicate with the UE, a communication signal in the spectrum during the time period, the communication signal associated with the service.

Further embodiments of the present disclosure include an apparatus comprising a transceiver configured to transmit a network information signal in a spectrum, the network information signal including at least a synchronization signal and an indication of a service advertising signal transmission time period allocated to a second wireless communication device; and a processor configured to refrain from communicating in the spectrum during the service advertising signal transmission time period, wherein the apparatus and the second wireless communication device are associated with different operating entities of the spectrum.

In some embodiments, wherein the apparatus is associated with a controlling entity of the spectrum, and wherein the second wireless communication device is associated with a local operating entity of the spectrum. In some embodiments, wherein the transceiver is further configured to receive a request for an allocation in the spectrum for the second wireless communication device to transmit a service advertising signal; and transmit, in response to the request, a grant indicating a service advertising signal transmission time period allocated to the second wireless communication device. In some embodiments, wherein the grant indicates a periodicity of the service advertising signal transmission time period. In some embodiments, wherein the network information signal includes a synchronization signal, and wherein the periodicity of the service advertising signal transmission time period is different from a transmission periodicity of the synchronization signal. In some embodiments, wherein the transceiver is further configured to transmit an instruction to instruct the second wireless communication device to modify the periodicity of the service advertising signal transmission time period. In some embodiments, wherein the transceiver is further configured to transmit an instruction to instruct the second wireless communication device to suspend a subsequent service advertising signal transmission. In some embodiments, wherein the transceiver is further configured to receive a request for an allocation in the spectrum for a third wireless communication device to transmit a service advertising signal; and transmit, in response to the request, a grant indicating another service advertising signal transmission time period allocated to the third wireless communication device, wherein the second wireless communication device and the third wireless communication device are associated with different local operating entities. In some embodiments, wherein the transceiver is further configured to receive a spectrum use request for the second wireless communication device to use the spectrum for a time period; and monitor, during the time period, for a reservation from the second wireless communication device.

Further embodiments of the present disclosure include an apparatus comprising a transceiver configured to communicate, with a second wireless communication device in a first frequency band, a service advertising signal indicating an availability of a service in a second frequency band; and communicate, with the second wireless communication device in the second frequency band, a communication signal during a time period based on a spectrum use grant from a controlling entity of the second frequency band, the communication signal associated with the service, wherein the first frequency band and the second frequency band are different.

In some embodiments, wherein at least one of the apparatus or the second wireless communication device is associated with a local operating entity of the second frequency band. In some embodiments, wherein the transceiver is further configured to communicate the service advertising signal by transmitting the service advertising signal; and receive, from the second wireless communication device, a request for the service. In some embodiments, wherein the request is received in the first frequency band. In some embodiments, wherein the request is received in the second frequency band. In some embodiments, wherein the transceiver is further configured to communicate the service advertising signal by receiving, from the second wireless communication device, the service advertising signal; and transmit, to the second wireless communication device, a request for the service. In some embodiments, wherein the request is transmitted in the first frequency band. In some embodiments, wherein the request is transmitted in the second frequency band. In some embodiments, wherein the first frequency band is an unlicensed frequency band. In some embodiments, wherein the first frequency band is in a 3.5 gigahertz (GHz) spectrum.

Further embodiments of the present disclosure include a computer-readable medium having program code recorded thereon, the program code comprising code for causing a user equipment (UE) to receive, from a first wireless communication device, a network information signal in a spectrum; code for causing the UE to receive, from a second wireless communication device, a service advertising signal based on at least a synchronization to the network information signal, the service advertising signal indicating an availability of a service; and code for causing the UE to transmit, to the second wireless communication device, a request for the service, wherein the first wireless communication device and the second wireless communication device are associated with different operating entities of the spectrum.

In some embodiments, wherein the first wireless communication device is associated with a controlling entity of the spectrum, wherein the second wireless communication device is associated with a local operating entity of the spectrum, and wherein the UE is positioned in a geographic coverage area of the second wireless communication device. In some embodiments, wherein the network information signal indicates a service advertising signal transmission time period, and wherein the computer-readable medium further comprises code for causing the UE to monitor for the service advertising signal during the service advertising signal transmission time period. In some embodiments, wherein the network information signal indicates a periodicity of the service advertising signal transmission time period. In some embodiments, wherein the network information signal includes a synchronization signal, and wherein the periodicity of the service advertising signal transmission time period is different from a transmission periodicity of the synchronization signal. In some embodiments, the computer-readable medium further comprises code for causing the UE to receive, from the first wireless communication device, another network information channel signal indicating a modification to the periodicity of the service advertising signal transmission time period. In some embodiments, the computer-readable medium further comprises code for causing the UE to communicate, with the second wireless communication device, a communication signal in the spectrum based on a spectrum use grant from the first wireless communication device, the communication signal associated with the service.

Further embodiments of the present disclosure include a computer-readable medium having program code recorded thereon, the program code comprising code for causing a first wireless communication device to obtain a network configuration for communication in a spectrum; code for causing the first wireless communication device to transmitting, by the first wireless communication device, a service advertising signal in the spectrum based on the network configuration, the service advertising signal being based on a synchronization to a network information signal transmitted by a second wireless communication device, the service advertising signal indicating an availability of a service; and code for causing the first wireless communication device to receive, from a user equipment (UE), a request for the service, wherein the first wireless communication device and the second wireless communication device are associated with different operating entities of the spectrum.

In some embodiments, wherein the first wireless communication device is associated with a local operating entity of the spectrum, wherein the second wireless communication device is associated with a controlling entity of the spectrum, and wherein the UE is positioned in a geographic coverage area of the first wireless communication device. In some embodiments, wherein the code for causing the first wireless communication device to obtain the network configuration is further configured to request an allocation in the spectrum for a service advertising signal transmission; and receive the network configuration indicating a service advertising signal transmission time period allocated to the first wireless communication device, and wherein the code for causing the first wireless communication device to transmit the service advertising signal is further configured to transmit the service advertising signal during the service advertising signal transmission time period. In some embodiments, wherein the network configuration further indicates a periodicity of the service advertising signal transmission time period. In some embodiments, wherein the network information signal includes a synchronization signal, and wherein the periodicity of the service advertising signal transmission time period is different from a transmission periodicity of the synchronization signal. In some embodiments, the computer-readable medium further comprises code for causing the first wireless communication device to receive an instruction to modify the periodicity of the service advertising signal transmission time period. In some embodiments, the computer-readable medium further comprises code for causing the first wireless communication device to receive an instruction to suspend a subsequent service advertising signal transmission. In some embodiments, the computer-readable medium further comprises code for causing the first wireless communication device to request an allocation in the spectrum for a time period to provide the service; and code for causing the first wireless communication device to communicate, with the UE, a communication signal in the spectrum during the time period, the communication signal associated with the service.

Further embodiments of the present disclosure include a computer-readable medium having program code recorded thereon, the program code comprising code for causing a first wireless communication device to transmit a network information signal in a spectrum, the network information signal including at least a synchronization signal and an indication of a service advertising signal transmission time period allocated to a second wireless communication device; and code for causing the first wireless communication device to refrain from communicating in the spectrum during the service advertising signal transmission time period, wherein the first wireless communication device and the second wireless communication device are associated with different operating entities of the spectrum.

In some embodiments, wherein the first wireless communication device is associated with a controlling entity of the spectrum, and wherein the second wireless communication device is associated with a local operating entity of the spectrum. In some embodiments, the computer-readable medium further comprises code for causing the first wireless communication device to receive a request for an allocation in the spectrum for the second wireless communication device to transmit a service advertising signal; and code for causing the first wireless communication device to transmit, in response to the request, a grant indicating a service advertising signal transmission time period allocated to the second wireless communication device. In some embodiments, wherein the grant indicates a periodicity of the service advertising signal transmission time period. In some embodiments, wherein the network information signal includes a synchronization signal, and wherein the periodicity of the service advertising signal transmission time period is different from a transmission periodicity of the synchronization signal. In some embodiments, the computer-readable medium further comprises code for causing the first wireless communication device to transmit an instruction to instruct the second wireless communication device to modify the periodicity of the service advertising signal transmission time period. In some embodiments, the computer-readable medium further comprises code for causing the first wireless communication device to transmit an instruction to instruct the second wireless communication device to suspend a subsequent service advertising signal transmission. In some embodiments, the computer-readable medium further comprises code for causing the first wireless communication device to receive a request for an allocation in the spectrum for a third wireless communication device to transmit a service advertising signal; and code for causing the first wireless communication device to transmit, in response to the request, a grant indicating another service advertising signal transmission time period allocated to the third wireless communication device, wherein the second wireless communication device and the third wireless communication device are associated with different local operating entities. In some embodiments, the computer-readable medium further comprises code for causing the first wireless communication device to receive a spectrum use request for the second wireless communication device to use the spectrum for a time period; and code for causing the first wireless communication device to monitor, during the time period, for a reservation from the second wireless communication device.

Further embodiments of the present disclosure include a computer-readable medium having program code recorded thereon, the program code comprising code for causing a first wireless communication device to communicate, with a second wireless communication device in a first frequency band, a service advertising signal indicating an availability of a service in a second frequency band; and code for causing the first wireless communication device to communicate, with the second wireless communication device in the second frequency band, a communication signal during a time period based on a spectrum use grant from a controlling entity of the second frequency band, the communication signal associated with the service, wherein the first frequency band and the second frequency band are different.

In some embodiments, wherein at least one of the first wireless communication device or the second wireless communication device is associated with a local operating entity of the second frequency band. In some embodiments, wherein the code for causing the first wireless communication device to communicate the service advertising signal is further configured to transmit the service advertising signal, and wherein the computer-readable medium further comprises code for causing the first wireless communication device to receive, from the second wireless communication device, a request for the service. In some embodiments, wherein the code for causing the first wireless communication device to receive the request is further configured to receive the request in the first frequency band. In some embodiments, wherein the code for causing the first wireless communication device to receive the request is further configured to receive the request in the second frequency band. In some embodiments, wherein the code for causing the first wireless communication device to communicate the service advertising signal is further configured to receive, from the second wireless communication device, the service advertising signal, and wherein the computer-readable medium further comprises code for causing the first wireless communication device to transmit, to the second wireless communication device, a request for the service. In some embodiments, wherein the code for causing the first wireless communication device to transmit the request is further configured to transmit the request in the first frequency band. In some embodiments, wherein the code for causing the first wireless communication device to transmit the request is further configured to transmit the request in the second frequency band. In some embodiments, wherein the first frequency band is an unlicensed frequency band. In some embodiments, wherein the first frequency band is in a 3.5 gigahertz (GHz) spectrum.

Further embodiments of the present disclosure include an apparatus comprising means for receiving, from a first wireless communication device, a network information signal in a spectrum; means for receiving, from a second wireless communication device, a service advertising signal based on at least a synchronization to the network information signal, the service advertising signal indicating an availability of a service; and means for transmitting, to the second wireless communication device, a request for the service, wherein the first wireless communication device and the second wireless communication device are associated with different operating entities of the spectrum.

In some embodiments, wherein the first wireless communication device is associated with a controlling entity of the spectrum, wherein the second wireless communication device is associated with a local operating entity of the spectrum, and wherein the apparatus is positioned in a geographic coverage area of the second wireless communication device. In some embodiments, wherein the network information signal indicates a service advertising signal transmission time period, and wherein the apparatus further comprises means for monitoring for the service advertising signal during the service advertising signal transmission time period. In some embodiments, wherein the network information signal indicates a periodicity of the service advertising signal transmission time period. In some embodiments, wherein the network information signal includes a synchronization signal, and wherein the periodicity of the service advertising signal transmission time period is different from a transmission periodicity of the synchronization signal. In some embodiments, the apparatus further comprises means for receiving, from the first wireless communication device, another network information channel signal indicating a modification to the periodicity of the service advertising signal transmission time period. In some embodiments, the apparatus further comprises means for communicating, with the second wireless communication device, a communication signal in the spectrum based on a spectrum use grant from the first wireless communication device, the communication signal associated with the service.

Further embodiments of the present disclosure include an apparatus comprising means for obtaining a network configuration for communication in a spectrum; means for transmitting a service advertising signal in the spectrum based on the network configuration, the service advertising signal being based on a synchronization to a network information signal transmitted by a second wireless communication device, the service advertising signal indicating an availability of a service; and means for receiving, from a user equipment (UE), a request for the service, wherein the first wireless communication device and the second wireless communication device are associated with different operating entities of the spectrum.

In some embodiments, wherein the first wireless communication device is associated with a local operating entity of the spectrum, wherein the second wireless communication device is associated with a controlling entity of the spectrum, and wherein the UE is positioned in a geographic coverage area of the first wireless communication device. In some embodiments, wherein the obtaining includes means for requesting an allocation in the spectrum for a service advertising signal transmission; and means for receiving the network configuration indicating a service advertising signal transmission time period allocated to the first wireless communication device, and wherein the means for transmitting the service advertising signal is further configured to transmit the service advertising signal during the service advertising signal transmission time period. In some embodiments, wherein the network configuration further indicates a periodicity of the service advertising signal transmission time period. In some embodiments, wherein the network information signal includes a synchronization signal, and wherein the periodicity of the service advertising signal transmission time period is different from a transmission periodicity of the synchronization signal. In some embodiments, the apparatus further comprises means for receiving an instruction to modify the periodicity of the service advertising signal transmission time period. In some embodiments, the apparatus further comprises means for receiving an instruction to suspend a subsequent service advertising signal transmission. In some embodiments, the apparatus further comprises means for requesting an allocation in the spectrum for a time period to provide the service; and means for communicating a communication signal in the spectrum during the time period, the communication signal associated with the service.

Further embodiments of the present disclosure include an apparatus comprising means for transmitting a network information signal in a spectrum, the network information signal including at least a synchronization signal and an indication of a service advertising signal transmission time period allocated to a second wireless communication device; and means for refraining from communicating in the spectrum during the service advertising signal transmission time period, wherein the apparatus and the second wireless communication device are associated with different operating entities of the spectrum.

In some embodiments, wherein the apparatus is associated with a controlling entity of the spectrum, and wherein the second wireless communication device is associated with a local operating entity of the spectrum. In some embodiments, the apparatus further comprises means for receiving a request for an allocation in the spectrum for the second wireless communication device to transmit a service advertising signal; and means for transmitting, in response to the request, a grant indicating a service advertising signal transmission time period allocated to the second wireless communication device. In some embodiments, wherein the grant indicates a periodicity of the service advertising signal transmission time period. In some embodiments, wherein the network information signal includes a synchronization signal, and wherein the periodicity of the service advertising signal transmission time period is different from a transmission periodicity of the synchronization signal. In some embodiments, the apparatus further comprises means for transmitting an instruction to instruct the second wireless communication device to modify the periodicity of the service advertising signal transmission time period. In some embodiments, the apparatus further comprises means for transmitting an instruction to instruct the second wireless communication device to suspend a subsequent service advertising signal transmission. In some embodiments, the apparatus further comprises means for receiving a request for an allocation in the spectrum for a third wireless communication device to transmit a service advertising signal; and means for transmitting, in response to the request, a grant indicating another service advertising signal transmission time period allocated to the third wireless communication device, wherein the second wireless communication device and the third wireless communication device are associated with different local operating entities. In some embodiments, the apparatus further comprises means for receiving a spectrum use request for the second wireless communication device to use the spectrum for a time period; and means for monitoring, during the time period, for a reservation from the second wireless communication device.

Further embodiments of the present disclosure include an apparatus comprising means for communicating, with a second wireless communication device in a first frequency band, a service advertising signal indicating an availability of a service in a second frequency band; and means for communicating, with the second wireless communication device in the second frequency band, a communication signal during a time period based on a spectrum use grant from a controlling entity of the second frequency band, the communication signal associated with the service, wherein the first frequency band and the second frequency band are different.

In some embodiments, wherein at least one of the apparatus or the second wireless communication device is associated with a local operating entity of the second frequency band. In some embodiments, wherein the means for communicating the service advertising signal is further configured to transmit the service advertising signal, and wherein the apparatus further comprises means for receiving, from the second wireless communication device, a request for the service. In some embodiments, wherein the means for receiving the request is further configured to receive the request in the first frequency band. In some embodiments, wherein the means for receiving the request is further configured to receive the request in the second frequency band. In some embodiments, wherein the means for communicating the service advertising signal is further configured to receive, from the second wireless communication device, the service advertising signal, and wherein the apparatus further comprises means for transmitting, to the second wireless communication device, a request for the service. In some embodiments, wherein the means for transmitting the request is further configured to transmit the request in the first frequency band. In some embodiments, wherein the means for transmitting the request is further configured to transmit the request in the second frequency band. In some embodiments, wherein the first frequency band is an unlicensed frequency band. In some embodiments, wherein the first frequency band is in a 3.5 gigahertz (GHz) spectrum.

As those of some skill in this art will by now appreciate and depending on the particular application at hand, many modifications, substitutions and variations can be made in and to the materials, apparatus, configurations and methods of use of the devices of the present disclosure without departing from the spirit and scope thereof. In light of this, the scope of the present disclosure should not be limited to that of the particular embodiments illustrated and described herein, as they are merely by way of some examples thereof, but rather, should be fully commensurate with that of the claims appended hereafter and their functional equivalents.

What is claimed is:

1. A method of wireless communication, comprising:
receiving, by a user equipment (UE) from a first base station (BS) of a first network operated by a first operating entity, a network information signal in a frequency band allocated to the first operating entity;

receiving, by the UE from a second BS of a second network operated by a second operating entity different from the first operating entity, a service advertising signal indicating an availability of a service of the second network, the service advertising signal received in the frequency band and in synchronization with the network information signal of the first network;

transmitting, by the UE to the second BS, a request for the service of the second network; and communicating, by the UE with the second BS, a communication signal in the frequency band over the second network during a time period, wherein the communicating is based on the second BS being promoted from a first priority to a second priority for sharing the frequency band with the first BS during the time period in response to the request.

2. The method of claim 1, wherein the first operating entity is a controlling entity of the frequency band, wherein the second operating entity is a local operating entity of the frequency band, and wherein the UE is positioned in a geographic coverage area of the second BS of the second operating entity.

3. The method of claim 1, wherein the network information signal indicates a service advertising signal transmission time period, and wherein the method further comprises monitoring for the service advertising signal during the service advertising signal transmission time period.

4. The method of claim 3, wherein the network information signal indicates a periodicity of the service advertising signal transmission time period.

5. The method of claim 4, wherein the network information signal includes a synchronization signal, and wherein the periodicity of the service advertising signal transmission time period is different from a transmission periodicity of the synchronization signal.

6. The method of claim 4, further comprising receiving, by the UE from the first BS, another network information channel signal indicating a modification to the periodicity of the service advertising signal transmission time period.

7. The method of claim 1, wherein the communicating is further based on a spectrum use grant from the first BS, the communication signal associated with the service.

8. A method of wireless communication, comprising:
obtaining, by a first base station (BS) of a first network operated by a first operating entity, a network configuration for communication in a frequency band allocated to a second operating entity different from the first operating entity;

transmitting, by the first BS in the frequency band based on the network configuration, a service advertising signal indicating an availability of a service of the first network, the service advertising signal transmitted in synchronization with a network information signal of a second network operated by the second operating entity different from the first operating entity;

receiving, by the first BS from a user equipment (UE), a request for the service of the first network; and communicating, by the first BS with the UE, a communication signal in the frequency band over the first network during a time period, wherein the communicating is based on the first BS being promoted from a first priority to a second priority for sharing the frequency band with the second network during the time period in response to the request.

9. The method of claim 8, wherein the first operating entity is a local operating entity of the frequency band, wherein the second operating entity is a controlling entity of the frequency band, and wherein the UE is positioned in a geographic coverage area of the first BS of the first operating entity.

10. The method of claim 8, wherein the obtaining includes:
requesting, by the first BS, an allocation in the frequency band for a service advertising signal transmission; and receiving, by the first BS, the network configuration indicating a service advertising signal transmission time period allocated to the first BS, and wherein the transmitting the service advertising signal includes transmitting the service advertising signal during the service advertising signal transmission time period.

11. The method of claim 10, wherein the network configuration further indicates a periodicity of the service advertising signal transmission time period.

12. The method of claim 11, wherein the network information signal includes a synchronization signal, and wherein the periodicity of the service advertising signal transmission time period is different from a transmission periodicity of the synchronization signal.

13. The method of claim 11, further comprising receiving, by the first BS, an instruction to modify the periodicity of the service advertising signal transmission time period.

14. The method of claim 8, further comprising receiving, by the first BS, an instruction to suspend a subsequent service advertising signal transmission.

15. The method of claim 8, further comprising:
requesting, by the first BS, an allocation in the frequency band for the time period to provide the service, and
wherein the communication signal is associated with the service.

16. A method of wireless communication, comprising:
communicating, by a first wireless communication device with a second wireless communication device, a service advertising signal in a first frequency band indicating an availability of a service in a second frequency band; and communicating, by the first wireless communication device with the second wireless communication device in the second frequency band, a communication signal during a time period based on a spectrum use grant from a controlling entity of the second frequency band, the communication signal associated with the service, the spectrum use grant granting at least one of the first wireless communication device or the second wireless communication device as a primary user in the second frequency band, wherein the first frequency band and the second frequency band are different.

17. The method of claim 16, wherein at least one of the first wireless communication device or the second wireless communication device is associated with a local operating entity of the second frequency band.

18. The method of claim 16, wherein the communicating the service advertising signal includes transmitting, by the first wireless communication device, the service advertising signal, and wherein the method further comprises receiving, by the first wireless communication device from the second wireless communication device, a request for the service.

19. The method of claim 18, wherein the receiving the request includes receiving the request in at least one of the first frequency band or the second frequency band.

20. The method of claim 16, wherein the communicating the service advertising signal includes receiving, by the first wireless communication device from the second wireless communication device, the service advertising signal, and wherein the method further comprises transmitting, by the first wireless communication device to the second wireless communication device, a request for the service.

21. The method of claim 20, wherein the transmitting the request includes transmitting the request in at least one of the first frequency band or the second frequency band.

22. The method of claim 16, wherein the first frequency band is an unlicensed frequency band.

23. The method of claim 16, wherein the first frequency band is in a 3.5 gigahertz (GHz) spectrum.

24. An apparatus comprising:
a transceiver configured to:
receive, from a first base station (BS) of a first network operated by a first operating entity, a network information signal in a frequency band allocated to the first operating entity;
receive, from a second BS of a second network operated by a second operating entity different from the first operating entity, a service advertising signal indicating an availability of a service of the second network, the service advertising signal received in the frequency band and in synchronization with the network information signal of the first network;
transmit, to the second BS, a request for the service of the second network; and
communicate, with the second BS, a communication signal in the frequency band over the second network during a time period, wherein the communication signal is communicated based on the second BS being promoted from a first priority to a second priority for sharing the frequency band with the first BS during the time period in response to the request.

25. The apparatus of claim 24, wherein the first operating entity is a controlling entity of the frequency band, wherein the second operating entity is a local operating entity of the frequency band, and wherein the apparatus is positioned in a geographic coverage area of the second BS of the second operating entity.

26. The apparatus of claim 24, wherein the network information signal indicates a service advertising signal transmission time period, and wherein the apparatus further comprises a processor configured to monitor for the service advertising signal during the service advertising signal transmission time period.

27. The apparatus of claim 26, wherein the network information signal indicates a periodicity of the service advertising signal transmission time period.

28. The apparatus of claim 27, wherein the network information signal includes a synchronization signal, and wherein the periodicity of the service advertising signal transmission time period is different from a transmission periodicity of the synchronization signal.

29. The apparatus of claim 27, wherein the transceiver is further configured to receive, from the first BS, another network information channel signal indicating a modification to the periodicity of the service advertising signal transmission time period.

30. The apparatus of claim 24, wherein the transceiver configured to communicate the communication signal is further configured to communicate, with the second BS, the communication signal in the frequency band based on a spectrum use grant from the first BS, the communication signal associated with the service.

* * * * *